US009756563B2

(12) United States Patent
Ang et al.

(10) Patent No.: US 9,756,563 B2
(45) Date of Patent: Sep. 5, 2017

(54) DYNAMIC BANDWIDTH SWITCHING FOR REDUCING POWER CONSUMPTION IN WIRELESS COMMUNICATION DEVICES

(71) Applicant: QUALCOMM Incorporated, San Diego, CA (US)

(72) Inventors: Peter Pui Lok Ang, San Diego, CA (US); Joseph Patrick Burke, Glenview, IL (US); Tingfang Ji, San Diego, CA (US); Naga Bhushan, San Diego, CA (US); Krishna Kiran Mukkavilli, San Diego, CA (US); Joseph Binamira Soriaga, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/393,736

(22) Filed: Dec. 29, 2016

(65) Prior Publication Data
US 2017/0111860 A1    Apr. 20, 2017

Related U.S. Application Data

(62) Division of application No. 14/846,051, filed on Sep. 4, 2015, now Pat. No. 9,572,106.
(Continued)

(51) Int. Cl.
*H04W 72/00* (2009.01)
*H04W 52/02* (2009.01)
(Continued)

(52) U.S. Cl.
CPC ....... *H04W 52/0212* (2013.01); *H04L 1/0018* (2013.01); *H04W 72/042* (2013.01); *H04W 72/048* (2013.01); *H04W 72/0453* (2013.01)

(58) Field of Classification Search
CPC ......... H04M 15/8214; H04W 72/0453; H04W 28/06; H04W 72/042; H04W 72/0446
(Continued)

(56) References Cited

U.S. PATENT DOCUMENTS 7,436,809 B2    10/2008    Harada et al.
8,488,700 B2 *   7/2013    Rofougaran ........... H04B 1/001
                                                          375/260
(Continued)

FOREIGN PATENT DOCUMENTS

EP              2077634 A1    7/2009

OTHER PUBLICATIONS

Huawei: "Energy Saving Techniques to Support Low Load Scenarios," 3GPP Draft; R1-101084 Energy Savings, 3rd Generation Partnership Project (3GPP), Mobile Competence Centre . 650, Route Des; F-06921 Sophia-Antipolis Cedex ; France, vol. RAN WGI, No. San Francisco, USA; Feb. 22, 2010, Feb. 17, 2010 (Feb. 17, 2010), XP050418977, [retrieved on Feb. 17, 2010].
(Continued)

*Primary Examiner* — Tu X Nguyen
(74) *Attorney, Agent, or Firm* — Liem T. Do

(57) ABSTRACT

Systems, methods, apparatuses, and computer-program products for performing dynamic bandwidth switching between control signals and data signals of differing bandwidths are disclosed. Frame formats are disclosed in which control signals are transmitted at different bandwidths than data signals. Receiver architectures for receiving the signaling formats are disclosed. A receiver can receive a relatively narrowband control signal while consuming a relatively low power and then dynamically adjust characteristics of various components to receive a data signal at a higher bandwidth while consuming a relatively higher power.

49 Claims, 16 Drawing Sheets

Related U.S. Application Data

(60) Provisional application No. 62/073,603, filed on Oct. 31, 2014.

(51) Int. Cl.
*H04L 1/00* (2006.01)
*H04W 72/04* (2009.01)

(58) Field of Classification Search
USPC .......................... 455/450, 451, 452.1, 452.2
See application file for complete search history.

(56) References Cited

U.S. PATENT DOCUMENTS

| | | | |
|---|---|---|---|
| 8,995,343 B2* | 3/2015 | Choi | H04L 1/0083 370/328 |
| 9,572,106 B2 | 2/2017 | Ang et al. | |
| 2009/0122765 A1* | 5/2009 | Dimou | H04W 88/06 370/336 |
| 2013/0230013 A1 | 9/2013 | Seo et al. | |

OTHER PUBLICATIONS

International Search Report and Written Opinion—PCT/US2015/048738—ISA/EPO—Dec. 10, 2015.

* cited by examiner

DYNAMIC BANDWIDTH SWITCHING FOR REDUCING POWER CONSUMPTION IN WIRELESS COMMUNICATION DEVICES

The present application is a divisional application of U.S. patent application Ser. No. 14/846,051, filed Sep. 4, 2015, which claims priority to and the benefit of U.S. Provisional Patent Application No. 62/073,603, filed Oct. 31, 2014, each of which is hereby incorporated by reference in its entirety.

TECHNICAL FIELD

This application relates to wireless communication systems, and more particularly to signaling formats with varying signal bandwidth and associated adaptation of transceivers to conserve power consumption in mobile devices and base stations.

BACKGROUND

The demand for wireless data services continues to increase exponentially. As the demand for data grows, techniques capable of delivering higher data rates to mobile devices continue to be of interest. One way to deliver higher data rates is to increase the spectral bandwidth available to wireless communication systems.

Reflecting the trend to use increasing bandwidth, current versions of 3rd Generation Partnership Project (3GPP) Long Term Evolution (LTE) networks have up to 100 megahertz (MHz) available for communication. Moreover, it is possible that future networks, such as fifth generation (or 5G) networks, may utilize several hundred MHz or more in an attempt meet future demand for data services.

As system bandwidth increases, data transmission can increase roughly proportionally without incurring a similar proportional increase in control overhead. Thus, in future time division multiplex (TDM) systems that multiplex control and data channels, there may be scenarios in which it would be inefficient for control channels to occupy as much bandwidth as data channels. There are inefficiencies both because spectral resources may be used unnecessarily that could be better utilized for other purposes and because mobile devices would be tuned to a larger bandwidth than needed, thereby wasting energy resources. Thus, there is a need to more efficiently multiplex control and data channels as available bandwidth increases in wireless communication systems.

SUMMARY

In one aspect of the disclosure, a method of wireless communication includes transmitting a control signal to a mobile device using a first bandwidth, and transmitting a data signal to the mobile device using a second bandwidth wider than the first bandwidth, wherein the control signal and the data signal are transmitted over a single carrier frequency.

In an additional aspect of the disclosure, a method of wireless communication in a mobile device includes receiving a control signal having a first bandwidth, and receiving a data signal having a second bandwidth wider than the first bandwidth, wherein the control signal and the data signal are received over a single carrier frequency.

In an additional aspect of the disclosure, a computer program product for wireless communications includes a non-transitory computer-readable medium having program code recorded thereon, the program code including code for causing a transmitter to transmit a control signal to a device using a first bandwidth. The program code further includes code for causing the transmitter to transmit a data signal to the device using a second bandwidth wider than the first bandwidth, wherein the control signal and the data signal are transmitted over a single carrier frequency.

In an additional aspect of the disclosure, a computer program product for wireless communications includes a non-transitory computer-readable medium having program code recorded thereon, the program code including code for causing a receiver to receive a control signal having a first bandwidth. The program code further includes code for causing the receiver to receive a data signal having a second bandwidth wider than the first bandwidth, wherein the control signal and the data signal are received over a single carrier frequency.

In an additional aspect of the disclosure, a mobile device includes an adjustable radio-frequency (RF) front end configured to receive a control signal having a first bandwidth, and receive a data signal having a second bandwidth wider than the first bandwidth, wherein the control signal and the data signal are received over a single carrier frequency.

In an additional aspect of the disclosure, a wireless communication apparatus includes an amplifier, an analog-to-digital converter (ADC), an analog filter coupled between the amplifier and the ADC, and a control processor coupled to the amplifier, the ADC, and the analog filter. The control processor is configured to, in response to receiving control information from a control signal having a first bandwidth, set the bandwidth of the amplifier and the ADC to a second bandwidth wider than the first bandwidth, and set the sampling rate of the ADC according to the second bandwidth.

In an additional aspect of the disclosure, a wireless communication apparatus includes a control processor configured to couple to an RF front end, adjust the RF front end to receive a control signal having a first bandwidth, and adjust the RF front end to receive a data signal having a second bandwidth wider than the first bandwidth, wherein the control signal and the data signal are received over a single carrier frequency.

DETAILED DESCRIPTION

Figure 1:
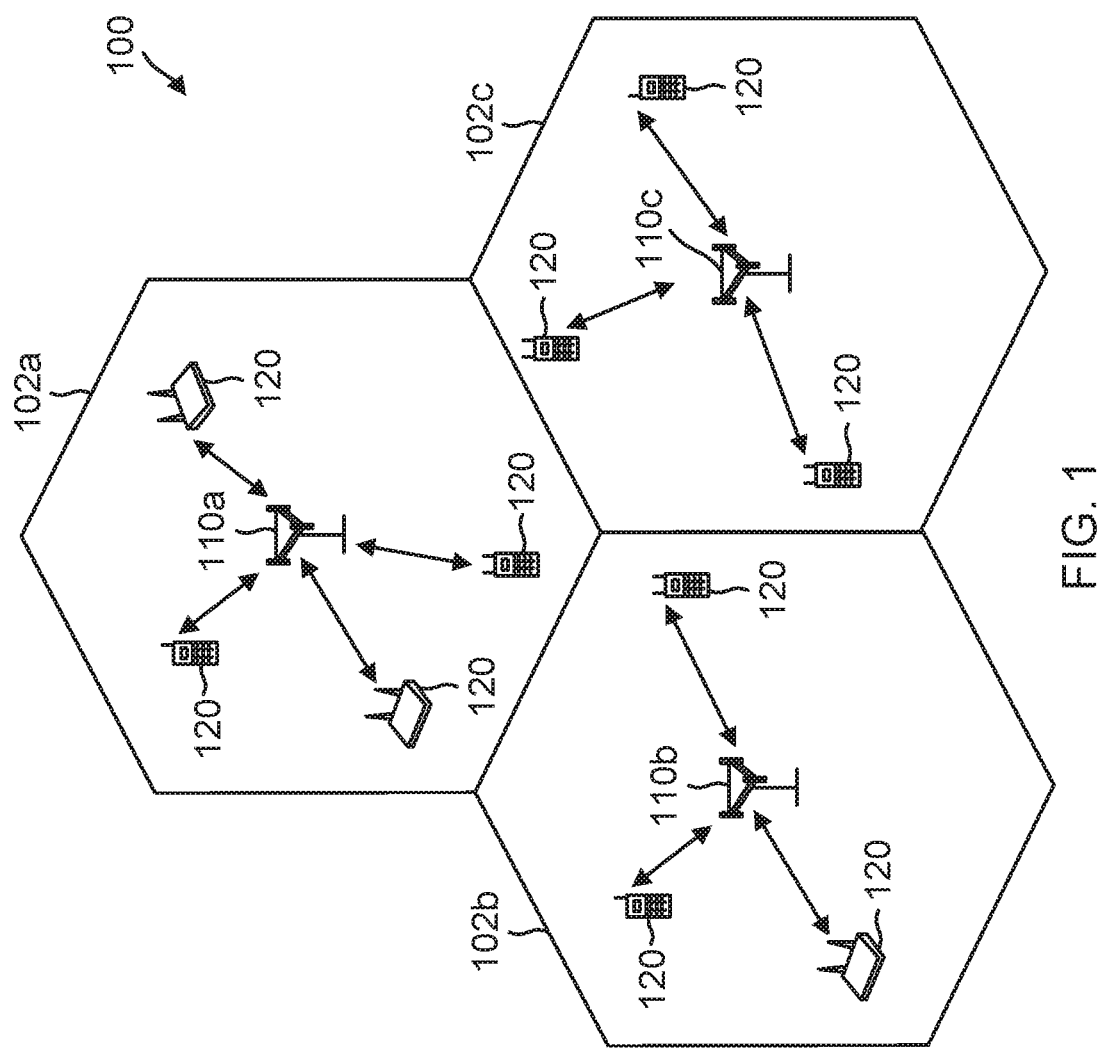
FIG. 1 illustrates a wireless communication network, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

This disclosure recognizes that as available system bandwidth increases, the bandwidth utilized by data signals can be increased (and thereby data rate can be increased) without corresponding increases in control channel signaling. Frame formats are disclosed that utilize narrowband control signals and wideband data signals. The frame formats provide for adjustments to be made in mobile device receivers to receive control signals at one bandwidth and data signals at wider bandwidths. A receiver can utilize a low-power mode to receive a control signal and then increase bandwidth and power consumption to receive a data signal. A transition interval or period can be inserted between a control signal and a data signal to allow the receiver time to adjust to the various signal bandwidths.

Power consumption in a wireless communications receiver scales with received signal bandwidth. This disclosure relates generally to wireless communication networks that employ control signals and data signals of different bandwidths. Receivers in such networks are provided to take advantage of and adjust to the different bandwidths to reduce power consumption. For example, power consumption in wireless devices can be reduced because control signals may occupy a smaller bandwidth than in conventional systems.

FIG. 1 illustrates a wireless communication network 100, in accordance with various aspects of the disclosure. The wireless communication network 100 may be an LTE network or a next generation (e.g., 5G) network. The wireless network 100 may include a number of base stations 110. A base station 110 may include an enhanced Node B in the LTE context. A base station may also be referred to as a base transceiver station or an access point.

The base stations 110 communicate with user equipments (UEs) 120 as shown. A UE 120 may communicate with a base station 110 via an uplink and a downlink. The downlink (or forward link) refers to the communication link from a base station 110 to a UE 120. The uplink (or reverse link) refers to the communication link from a UE 120 to a base station 110.

The UEs 120 may be dispersed throughout the wireless network 100, and each UE 120 may be stationary or mobile. A UE may also be referred to as a terminal, a mobile station, a subscriber unit, etc. A UE 120 may be a cellular phone, a smartphone, a personal digital assistant, a wireless modem, a laptop computer, a tablet computer, etc. The wireless communication network 100 is one example of a network to which various aspects of the disclosure apply. Other examples are WLANs.

Figure 2:
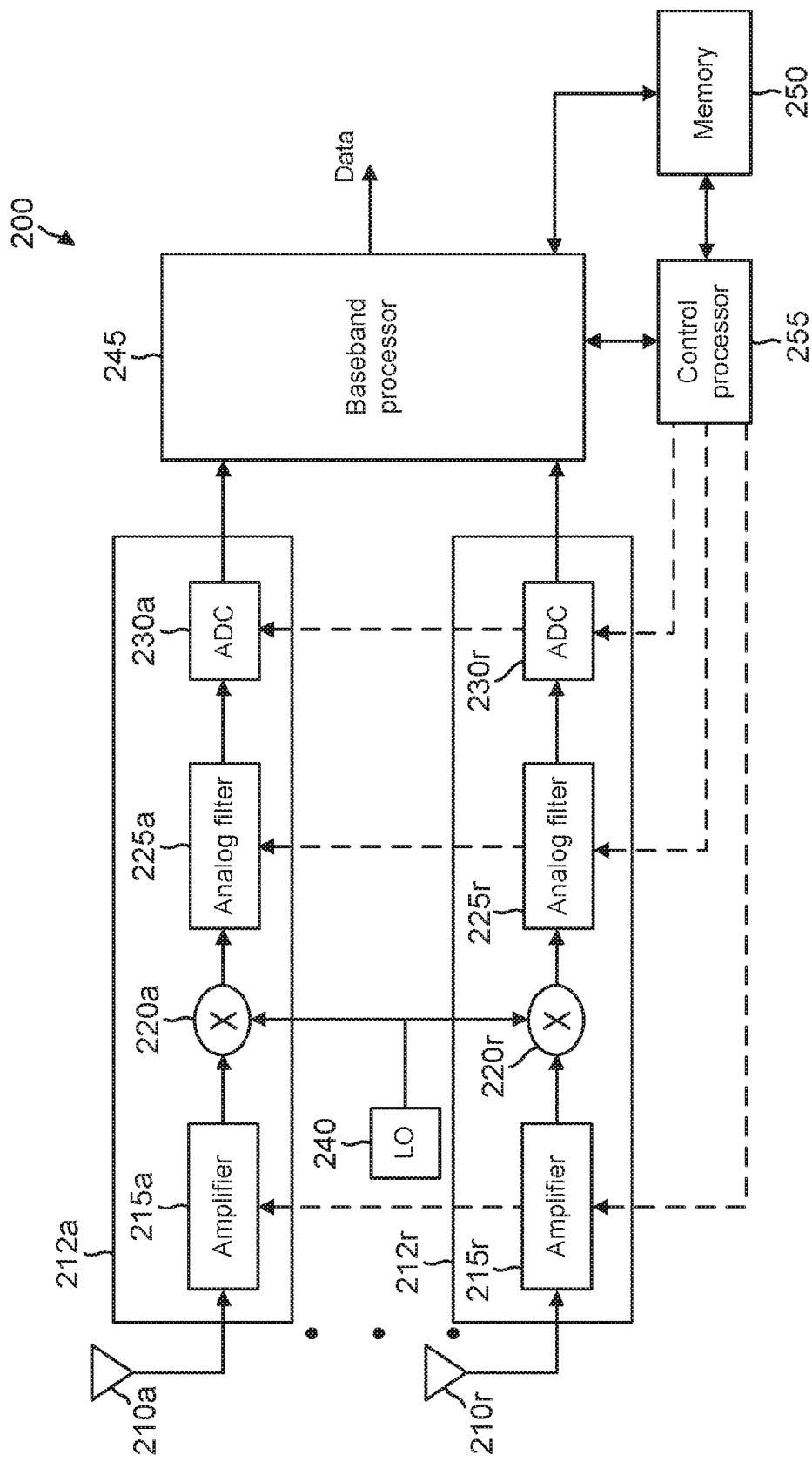
FIG. 2 is a high-level block diagram of an adjustable receiver in accordance with various aspects of the present disclosure.

FIG. 2 is a high-level block diagram of an adjustable receiver 200. The adjustable receiver 200 may be included in a UE 120. The adjustable receiver 200 may include one or more antennas 210. If the adjustable receiver 200 includes multiple antennas 210, any technique for multiple-input multiple-output communication (MIMO) may be employed. For convenience, the description will focus on one antenna 210a and its associated components with the understanding that the description applies to each antenna and its associated components.

In this example, the adjustable receiver 200 includes an RF front end 212a. In this example, the RF front end 212a includes an amplifier 215a, a mixer 220a, an analog filter 225a, and an analog-to-digital converter (ADC) 230a in communication with the antenna 210a as shown. The adjustable receiver 200 employs a zero intermediate frequency (IF) architecture in which a received signal at antenna 210a is amplified by amplifier 215a and then downconverted directly to baseband by mixer 220a in conjunction with local oscillator (LO) 240. A radio frequency (RF) amplifier, such as a low-noise amplifier (LNA), is an example of the amplifier 215a.

The analog filter 225a may be a low-pass filter with an adjustable bandwidth. The received signal is typically a sum of a desired data-carrying signal, interference, and noise. In some scenarios, the bandwidth of the analog filter 225a is set to prevent aliasing, permit the desired signal to pass with relatively little distortion to ADC 230a, and attenuate out of band interference and noise.

The ADC 230a receives an analog signal at its input and samples and digitizes the analog signal to produce a digital output. The sampling rate of the ADC 230a is sufficient to prevent or sufficiently limit aliasing of the signal and is generally at least twice the highest frequency component of the input signal. The sampling rate of the ADC 230*a* may be adjustable to satisfy the desired sampling rate according to signals with different input bandwidths.

The adjustable receiver 250 further includes a baseband processor 245. The baseband processor 245 receives the signals from all receive chains and performs demodulation and decoding (if needed) of the received signals.

The adjustable receiver further includes a control processor 255. The control processor 255 may direct the operation of the adjustable receiver 200. The control processor 255 generates one or more command signals (represented by dashed lines) intended for amplifiers 215, analog filters 225, ADCs 230, and/or the baseband processor 245. The command signals may also be referred to herein as internal control signals to distinguish the nomenclature from the uplink and downlink control signals transmitted over wireless channels.

The adjustable receiver 200 further includes a memory 250. The memory 250 may be any electronic component capable of storing information and/or instructions. For example, the memory 250 may include random access memory (RAM), read-only memory (ROM), flash memory devices in RAM, optical storage media, erasable programmable read-only memory (EPROM), registers, or combinations thereof. In an embodiment, the memory 250 includes a non-transitory computer-readable medium.

Instructions or code may be stored in the memory 250 that are executable by the baseband processor 245 and/or the control processor 255. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The control processor 255 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The control processor 255 may also be implemented as a combination of computing devices, e.g., a combination of a DSP and a microprocessor, a plurality of microprocessors, one or more microprocessors in conjunction with a DSP core, or any other such configuration.

The amplifiers 215, analog filters 225, and/or ADCs 230 may be components with adjustable parameters so that the adjustable receiver 200 is able to adapt to receive signals of different bandwidths in such a way that power consumption varies according to bandwidth. The power consumption generally decreases with decreasing bandwidth. For example, the amplifiers 215 and analog filters 225 may have bandwidths that are adjustable, with the bandwidths set according to the corresponding command signals. Furthermore, the ADCs 230 may have an adjustable sampling rate, with the sampling rates set according to the corresponding command signal.

Consider an example scenario in which the adjustable receiver 200 expects a relatively narrowband signal followed by a relatively wideband signal. Prior to receiving the narrowband signal, the control processor 255 can set the bandwidths of the amplifiers 215 and analog filters 225 accordingly, and can set the sampling rate of the ADCs 230 accordingly. After receiving the narrowband signal but before receiving the wideband signal, the control processor 255 can increase the bandwidths of the amplifiers 215 and analog filters 225 to accommodate the wider bandwidth, and can increase the sampling rate of the ADCs to also accommodate the wider bandwidth. The greater the bandwidth of the signal to be received, the more power is needed to process the signal.

It is understood that the zero IF architecture of FIG. 2 is one of many receiver architectures that are capable of adjusting to receive signals of various bandwidths. Many different receiver architectures in accordance with the present disclosure may employ amplifiers, filters, and ADCs in various combinations whose parameters can be adjusted.

This disclosure is directed to any type of modulation scheme, but orthogonal frequency division multiplexing (OFDM) is used as a representative modulation. OFDM is a flexible modulation scheme that provides for adjusting the bandwidth of the transmitted signal in a straightforward manner.

OFDM modulation utilizes a number of subcarriers. The spacing between subcarriers may be fixed, and the total number of subcarriers utilized may be changed depending on the bandwidth of the signal. For example, the spacing between subcarriers may be 4 kHz and the number of subcarriers may be 100, in which case the signal bandwidth is approximately 400 kHz (number of subcarriers times spacing between subcarriers), not counting any guard bands. Thus, one way to scale bandwidth using OFDM is to scale the number of subcarriers. There are other well-known ways to scale bandwidth of OFDM signals, such as scaling the frequency spacing between subcarriers. OFDM is demodulated using a fast Fourier transform (FFT), and the size of the FFT can be varied according to the number of subcarriers. Thus, the baseband processor 245 may include at least one adjustable FFT per antenna to adapt the demodulation to different signal bandwidths. The control processor 255 may control the baseband processor 245 to indicate FFT size or other parameters to adapt the baseband processor 245 to OFDM signals with parameters that vary according to bandwidth. After an OFDM signal is formed, it can be transmitted using a separate single high-frequency carrier, sometimes referred to as an RF carrier. The available time-frequency resources may be partitioned into resource blocks. Each resource block may cover N subcarriers (e.g., 12 subcarriers) in one OFDM symbol duration.

Figure 3:
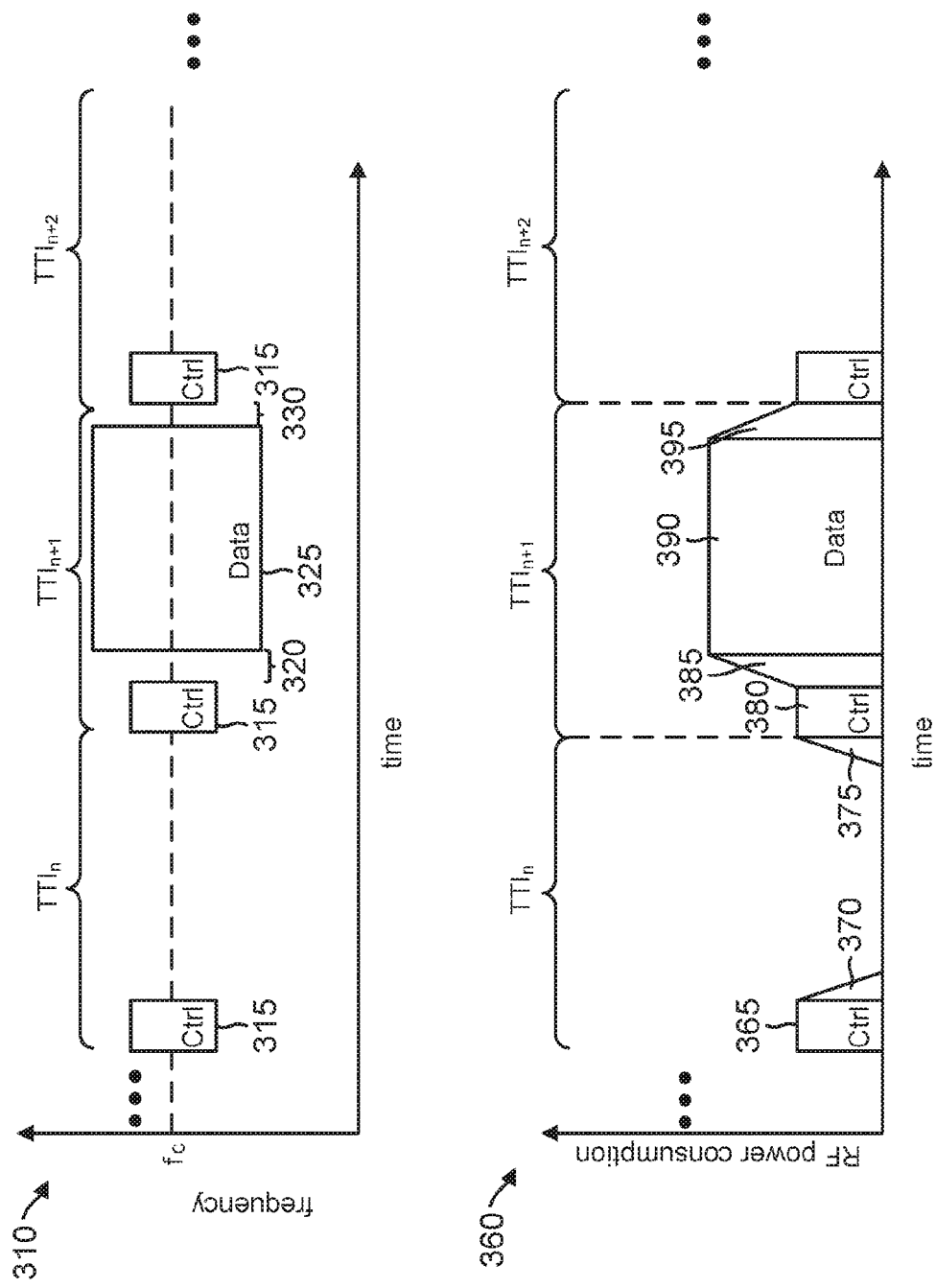
FIG. 3 illustrates a frame format and the corresponding power consumption of an RF front end during in accordance with various aspects of the present disclosure.

Operation of the adjustable receiver 200 is described further with reference to FIG. 3. FIG. 3 illustrates a frame format 310 and the corresponding power consumption 360 of an example RF front end, such as RF front end 212*a*, during reception of the illustrated frame format. The frame format 310 is a TDM format in which time is divided into transmission time intervals (TTIs). Control signals and data signals are time division multiplexed within a TTI. FIG. 3 illustrates an example sequence of transmitted signals within this frame format 310.

A TTI may refer to the duration of a transmission on the radio link. A TTI may be related to the size of the data blocks passed from the higher network layers to the radio link layer. In some embodiments, the duration of data symbols, such as OFDM symbols, is fixed, and there are a predetermined number of data symbol periods during each TTI. For example, each TTI may be any number of symbol periods, such as 8, 10, or 12 symbol periods, as examples.

In wireless communication systems, a downlink control signal may include information for a UE related to establishing, maintaining, or ending a data session. For example, a downlink control signal in a TTI may provide information to a UE about whether a downlink data signal follows in the TTI, and, if so, the control signal may indicate a bandwidth of the data signal.

The frame format 310 is designed with a purpose of reducing power consumption in UE receivers. A control signal 315 is transmitted at the beginning of each TTI. The control signal uses a relatively narrow bandwidth as compared to data signals. The bandwidth of control signals is sufficient to convey control information to intended UE(s), and it is not necessary to use the larger bandwidths used for data signals for the relatively small amount of control information. In a TTI, the control signal indicates whether there is a data signal following the control signal. In some embodiments, the bandwidth used for data signals is variable, in which case the control signal also indicates the bandwidth used for the data signal that follows. Alternatively, in some embodiments, data signals always occupy a certain bandwidth (such as the entire bandwidth), in which case the bandwidth of the data signal is understood or implied and there is no need for the control signal to convey bandwidth information.

Each of the transmitted signals is transmitted using a single carrier frequency $f_c$. Using a single carrier simplifies receivers as compared to systems that use carrier aggregation. Carrier aggregation typically requires the use of multiple LOs, whereas the signaling schemes described herein can use only one LO. However, the approaches described in the present disclosure can also be applied to multiple carrier frequencies.

The frame formats disclosed herein, such as frame format 310, may apply regardless of the number of antennas employed in the transmitting entity or the receiving entity. For example, in a SISO system, the signal is transmitted from the transmitting antenna and received at the receive antenna. As another example, in a MIMO system, the illustrated frame formats are transmitted from at least one antenna. Each antenna from among a plurality of antennas may transmit the same or a different pilot structure. In one embodiment, the illustrated frame format 310 will be received by a receive antenna, and may be part of a composite signal that is a sum of signals from a plurality of antennas.

In this example, in the $n^{th}$ TTI ($TTI_n$), the control signal 315 indicates to the designated UE that no data follows in the TTI. Adjustable receiver 200 can be used to receive the control signal 315. After the adjustable receiver 200 receives the control signal 315 in $TTI_n$, RF front-end components 215, 225, and 230 can be temporarily turned off or shut down by the control processor 255, placing the adjustable receiver 200 in a state of "microsleep." For example, a switch can be placed between a component, such as an amplifier 215, an analog filter 225, and/or an ADC 230, and its power supply, with the switch being opened for a period of time to shut down power to the component. Another example of "microsleep" is placing a component in an idle state in which it receives a reduced amount of power to operate in a reduced capacity.

The RF power consumption 360 of an RF front end, such as the RF front end 212a in adjustable receiver 200, is illustrated in FIG. 3 during reception of various signals. For example, during reception of control signal 315 in $TTI_n$, the power consumption is represented by 365. After determining that there is no data, the adjustable receiver 200 transitions to a state of microsleep, and the power consumption during that transition is represented by 370. The decrease in power consumption is represented as a linear decrease over time, but the actual decrease in power consumption may be non-linear but decreasing over time nonetheless. During the interval in $TTI_n$ after being placed in microsleep, the RF power consumption is much lower than when a signal is being received because amplifiers 215, analog filters 225, and ADCs 230 have been shut down.

A short time before $TTI_{n+1}$, the control processor 255 informs the amplifiers 215, analog filters 225, and ADCs 230 to power on prior to receiving control signal 315 during $TTI_{n+1}$. The power consumption during that transition is represented by 375, and the power consumption during reception of the control signal 315 in $TTI_{n+1}$ is represented by 380. The components in receiver 200 that have been shut down need a period of time to power up sufficiently to receive a signal.

In this example, control signal 315 is followed by data signal 325 in $TTI_{n+1}$. The baseband processor 245 demodulates the control signal 315 and provides control signal information to the control processor 255. The information in the control signal 315 indicates to the control processor 255 that a data signal will follow. In some scenarios, the data signal 325 is a wider bandwidth than the control signal 315. In response, control processor 255 informs amplifiers 215, analog filters 225, and ADCs 230 to adjust appropriately for the wider bandwidth. That is, the bandwidths of the amplifiers 215 and analog filters 225 are increased, and the sampling rate of the ADCs 230 is also increased. In some embodiments, the control processor 255 also informs baseband processor 245 to adapt accordingly to the increased bandwidth. For example, for demodulation of OFDM signals, the control processor 255 informs the baseband processor 245 to adjust FFT size or other parameters appropriately in order to demodulate the incoming data signal.

The frame format 310 may further provide for frequency division multiplexing (FDM) among users. For example, the data signal 325 of bandwidth B may be partitioned in the frequency domain with different portions of the bandwidth B allocated to different users. The RF front end 212 for a user may still be adjusted appropriately for the bandwidth B with extraction and demodulation of the desired portion being performed digitally in the frequency domain using OFDM techniques.

In one embodiment, the control signal 315 indicates not only that data will follow but also indicates the bandwidth of the data signal 325. In this case the control processor 255 determines the bandwidth. In other embodiments, the data signal 325 always occupies the same bandwidth, such as the entire available bandwidth, in which case the data signal bandwidth may be understood to be a certain value and there may be no need to include an indication in the control signal. If the bandwidth of the data signals is allowed to vary, components of the adjustable receiver 200 are adjusted from data signal to data signal to receive using just enough bandwidth sufficient to cover the bandwidth of the data signal of interest, instead of always tuning to receive using the entire available system bandwidth.

There is a transition period 320 between the control channel 315 and the data signal 325 to allow the adjustable receiver 200 to adjust to the different bandwidth. The transition period 320 may be referred to as a switching interval because the receiver 200 is switching from one bandwidth to another. The switching interval may be quantized to an integer number of symbol periods, such as OFDM symbol periods. The power consumption during this transition period 320 is represented by 385, and the power consumption during reception of the data signal 325 is represented by 390.

There is a transition period 330 between the data signal 325 and the next control signal 315 in $TTI_{n+2}$. The transition period 330 allows the adjustable receiver 200 time to transition to a smaller bandwidth for control signal 315. The power consumed during the transition period 330 is represented by 395.

Some conventional TDM systems typically do not include the transition periods 320 and 330 to allow a receiver to adjust. One reason is that in some conventional TDM systems the control signal is transmitted using the same bandwidth as the data signal so receivers do not need to transition between different bandwidths. Thus, the power consumed during transition periods 320 and 330 represent a power penalty for the signaling scheme in FIG. 3 as compared to some conventional systems. However, there is a substantial power savings during reception of the control signal 315 in the frame format illustrated in FIG. 3. The power saving includes the difference in power between the RF power consumed during reception of the data signal and the RF power consumed during reception of the control signal. The corresponding energy savings is computed as an area under the power curves. Under some conditions, the total energy saving exceeds the energy penalty, in which case the frame format and corresponding adjustable receiver 200 extends battery life as compared to conventional TDM systems.

Figure 4:
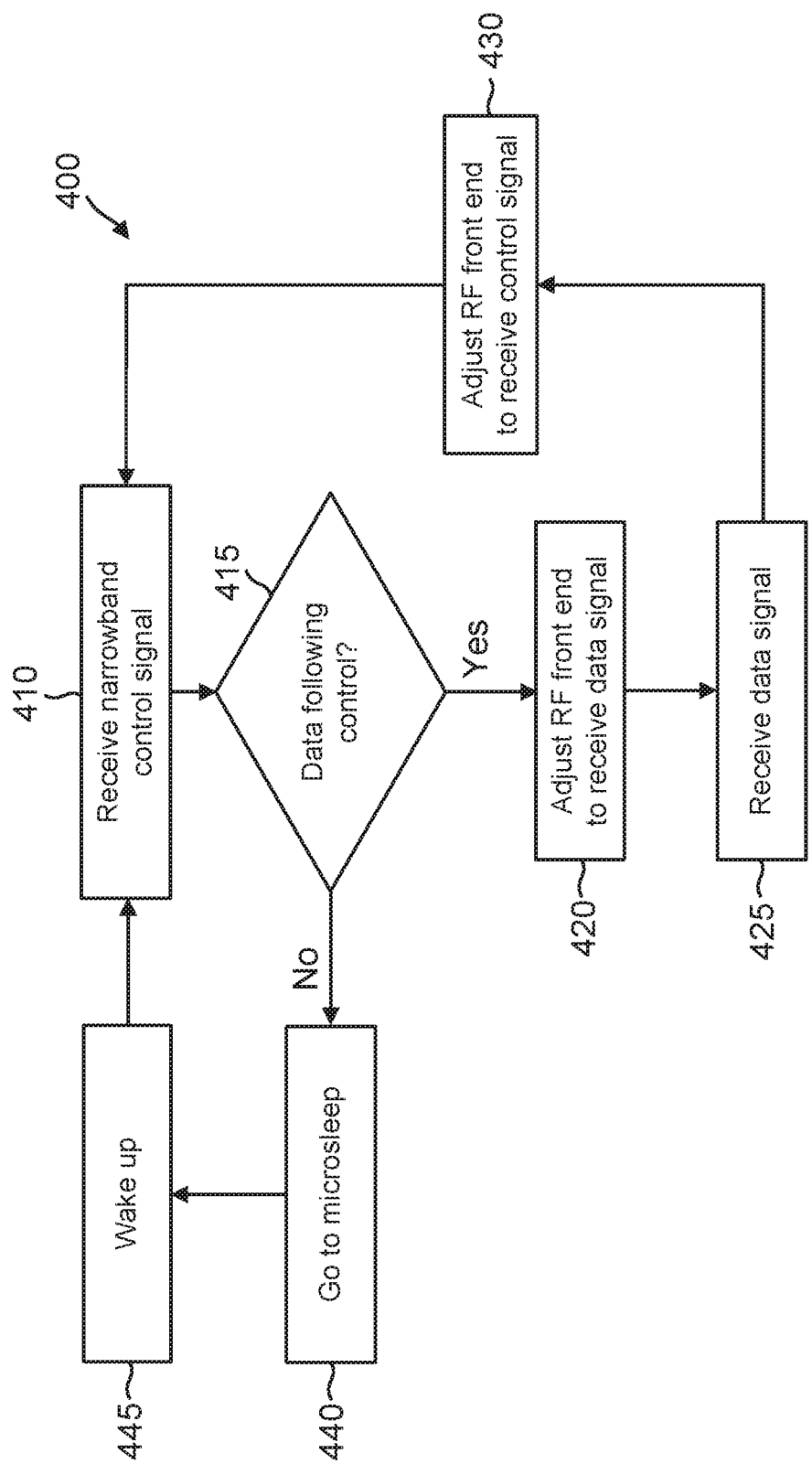
FIG. 4 is a flowchart illustrating an exemplary method for receiving control and data signals in accordance with various aspects of the present disclosure.

FIG. 4 is a flowchart illustrating an exemplary method 400 for receiving control and data signals. The method 400 may be implemented in the adjustable receiver 200, and the method 400 is described with reference to the adjustable receiver 200. The signals that are received in method 400 are transmitted by a base station 110 or other type of access point. Instructions or code may be stored in the memory 250 that are executable by the control processor 255 in the adjustable receiver 200 of FIG. 2 to implement the method 400.

The method 400 begins in block 410. In block 410 a narrowband control signal is received and processed by the adjustable receiver 200. The control signal is referred to as a narrowband control signal because its bandwidth is typically lower than the data signals, as illustrated in the signaling scheme in FIG. 3. In block 415, a decision is made whether a data signal follows the control signal in the current TTI. The control signal will contain this information, and the control signal is demodulated to extract this information.

If it is determined that no data signal follows the control signal in the current TTI, the method proceeds to block 440, in which the power provided to certain RF front-end components, such as amplifiers 215, analog filters 225, and/or ADCs 230, is reduced to place the components in a microsleep state. The control processor 255 may send signals to the components in the receiver 200 to control their status as described earlier. After a period of time, in block 445 the components are directed to power up or "wake up" to prepare to receive another control signal in block 410. The receiver 200 may wait until just before the beginning of the next TTI to request for the RF front-end components to wake up.

If it is determined in block 415 that a data signal does follow the control signal, the method proceeds to block 420. In block 420, an RF front end 212a of the receiver 200 is adjusted to receive the data signal. As described earlier, the control signal may contain information about the expected bandwidth of the data signal. Alternatively, the bandwidth of the data signal may be understood to be a certain value. In either case, the RF front end is adjusted. The control processor 255 controls the adjustment. The baseband processor 245 may also be adjusted.

Next in block 425 the data signal is received and processed. After the data signal is received in block 425, the RF front end is adjusted to receive a control signal in block 430 and the method returns to block 410 to start again. The method 400 continues as long as desired for a communication session. In some embodiments, a control signal is transmitted at the beginning of each TTI and no further control signals are transmitted within each TTI. In other embodiments, at least one additional control signal is transmitted in each TTI. For example, there may be a control signal at the beginning of a TTI and another control signal in the middle of the TTI.

Figure 5:
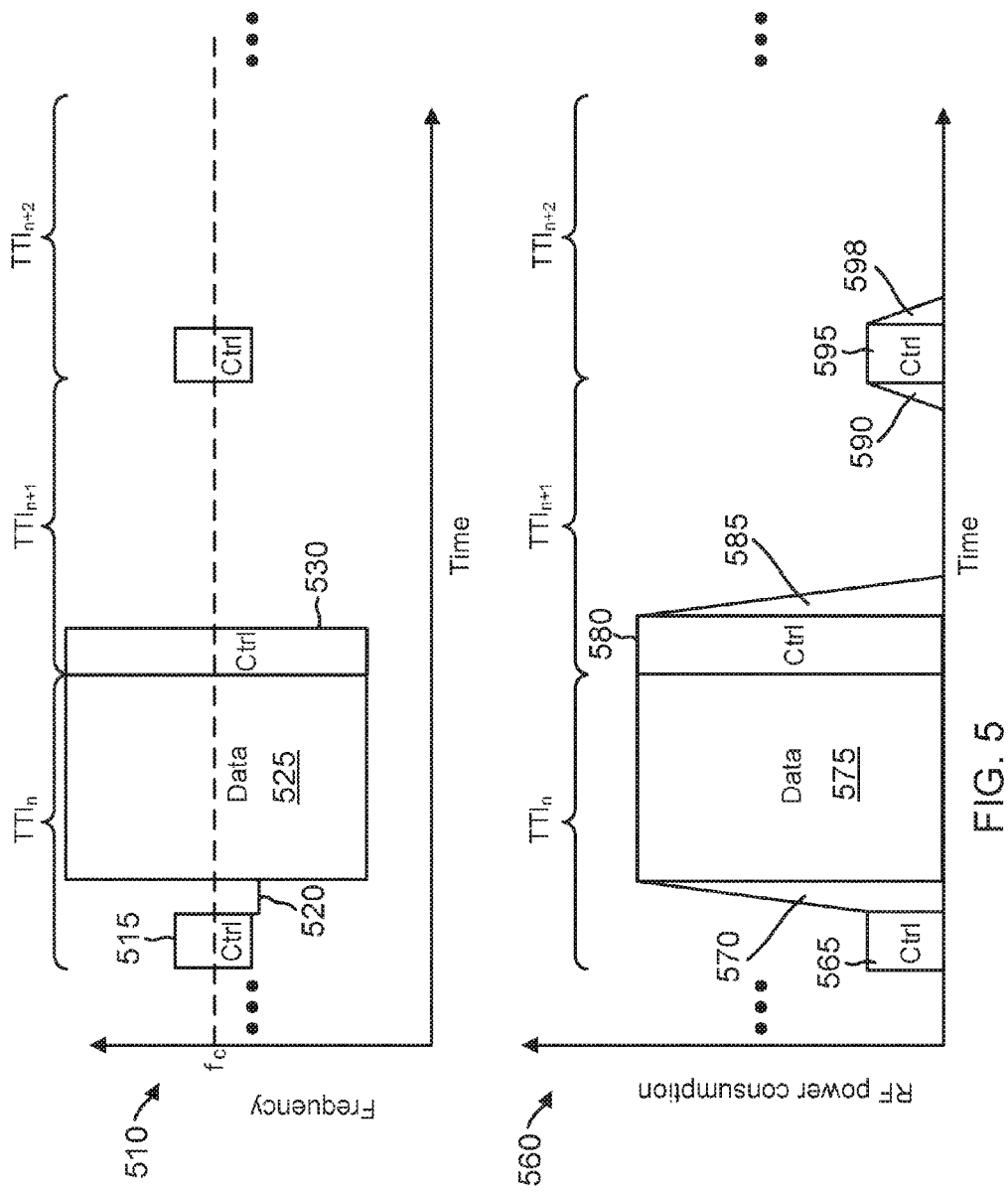
FIG. 5 illustrates another frame format and the corresponding power consumption of an RF front end during reception of the illustrated frame format in accordance with various aspects of the present disclosure.

FIG. 5 illustrates another frame format 510 and the power consumption of an RF front end 560 during reception of the illustrated frame format. The frame format 510 is a TDM format in which time is divided into transmission time intervals (TTIs) and control signals and data signals are time division multiplexed. FIG. 5 illustrates a transmitted signal sequence within this frame format 510.

The transmitted signal sequence in the frame format 510 is different than the frame format 310 in that if a data signal is transmitted, the next control signal is transmitted using the bandwidth as the data signal so that there is no switching time or switching interval for adjusting an RF front end. Since there is no need to adjust the RF front end, a data signal can be transmitted until the TTI boundary. The signaling format trades off the potential for energy savings with a more narrowband control signal against the benefit of being able to eliminate dead time for signaling due to switching. Thus, the signaling scheme uses both narrowband and wideband control signals, depending on whether the control signal follows a data signal.

Figure 6:
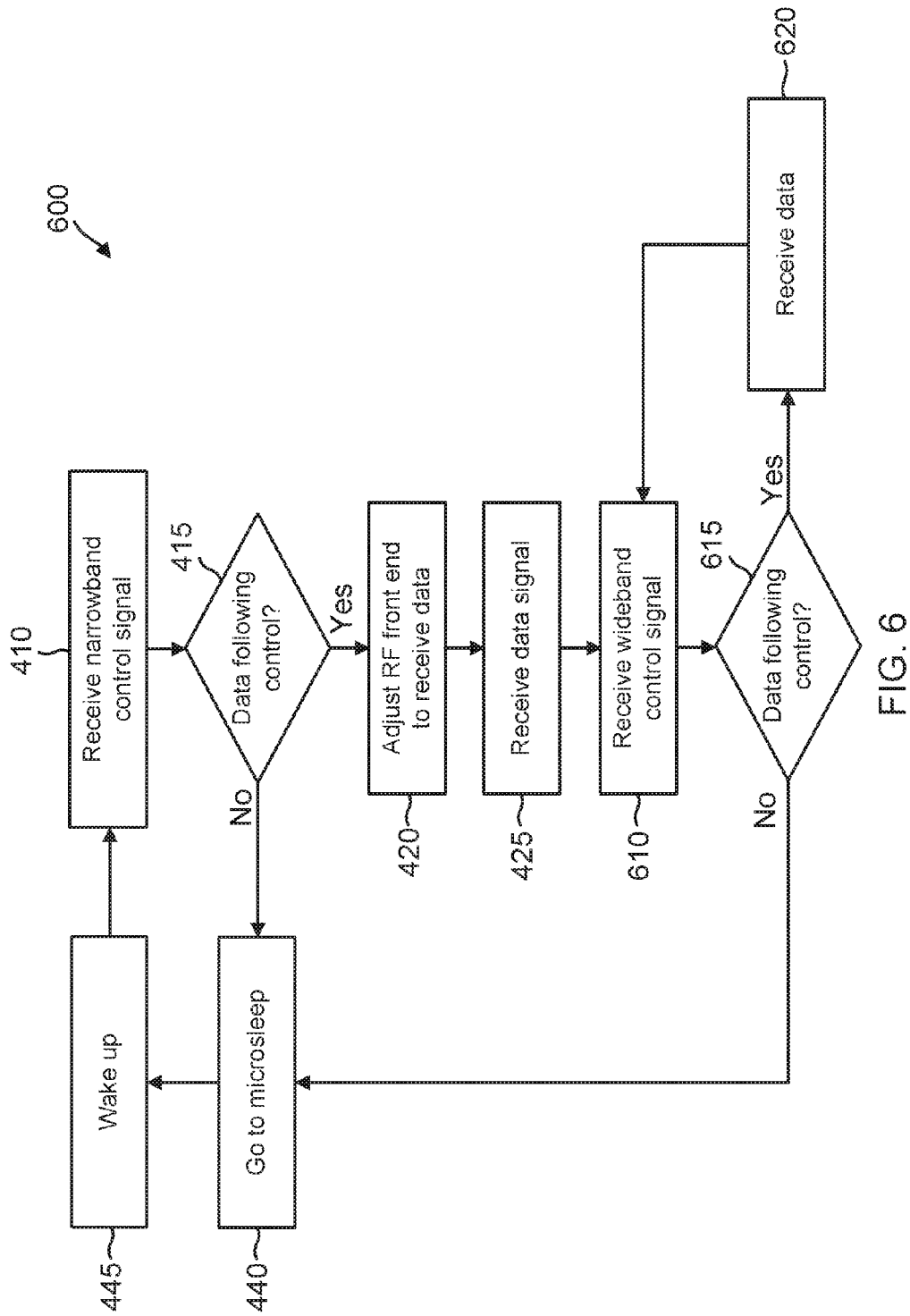
FIG. 6 is a flowchart illustrating another exemplary method for receiving control and data signals in accordance with various aspects of the present disclosure.

The similarities and differences between the signaling scheme illustrated in FIG. 5 and the signaling scheme in FIG. 3 can be understood with reference to FIG. 6. FIG. 6 is a flowchart illustrating an exemplary method 600 for receiving control and data signals. In FIG. 6, blocks 410-425, 440, and 445 are the same as the corresponding blocks in FIG. 4.

After a data signal is received in block 425, the method 600 proceeds to block 610 in which a wideband control signal is received. The control signal may be referred to as a wideband control signal because the bandwidth is the same as the previously received data signal, and data signal bandwidth is typically larger than the narrowband control signal bandwidth. The control signal 515 in the frame format 510 in FIG. 5 is an example narrowband control signal, and the control signal 530 is an example wideband control signal. The narrowband control signal 515 is followed by a transition period 520 to allow an RF front end to adjust to receive the data signal 525. There is no transition period needed between the data signal 525 and the control signal 530 because the bandwidths are the same.

As discussed previously with respect to FIG. 3, the frame format 510 may further provide for FDM among users. For example, the data signal 525 of bandwidth B may be partitioned in the frequency domain with different portions of the bandwidth B allocated to different users. Likewise, the control signal 530 may be partitioned similarly. The RF front end 212 for a user may still be adjusted appropriately for the bandwidth B with extraction and demodulation of the desired portion being performed digitally in the frequency domain using OFDM techniques.

Next in decision block 615, a determination is made whether a data signal follows the wideband control signal in the TTI. If data follows the wideband control signal, in one embodiment then the data is transmitted at the same bandwidth as the control signal, so there is no need to adjust the RF front end, and the data signal is received in block 620. In another embodiment, the data is transmitted generally at a bandwidth B that may be larger or smaller than the control signal bandwidth, so there may be a transition period during which the RF front end is adjusted to receive the data signal.

On the other hand, if there is no data signal following the wideband control signal then the method 600 proceeds to block 440. In block 440, the power provided to certain RF front end components, such as amplifiers 215, analog filters 225, and/or ADCs 230, is reduced to place the components in a microsleep state. After a period of time, in block 445 the components are directed to power up or "wake up" to prepare to receive another control signal in block 410. The receiver 200 may wait until just before the beginning of the next TTI to request for the RF front-end components to wake up. As part of the wake up process, the bandwidth and sampling rate(s) of the RF front end are set to receive a narrowband control signal. Instructions or code may be stored in the memory 250 of the adjustable receiver 200 that are executable by the control processor 255 to implement the method 600.

Figure 7:
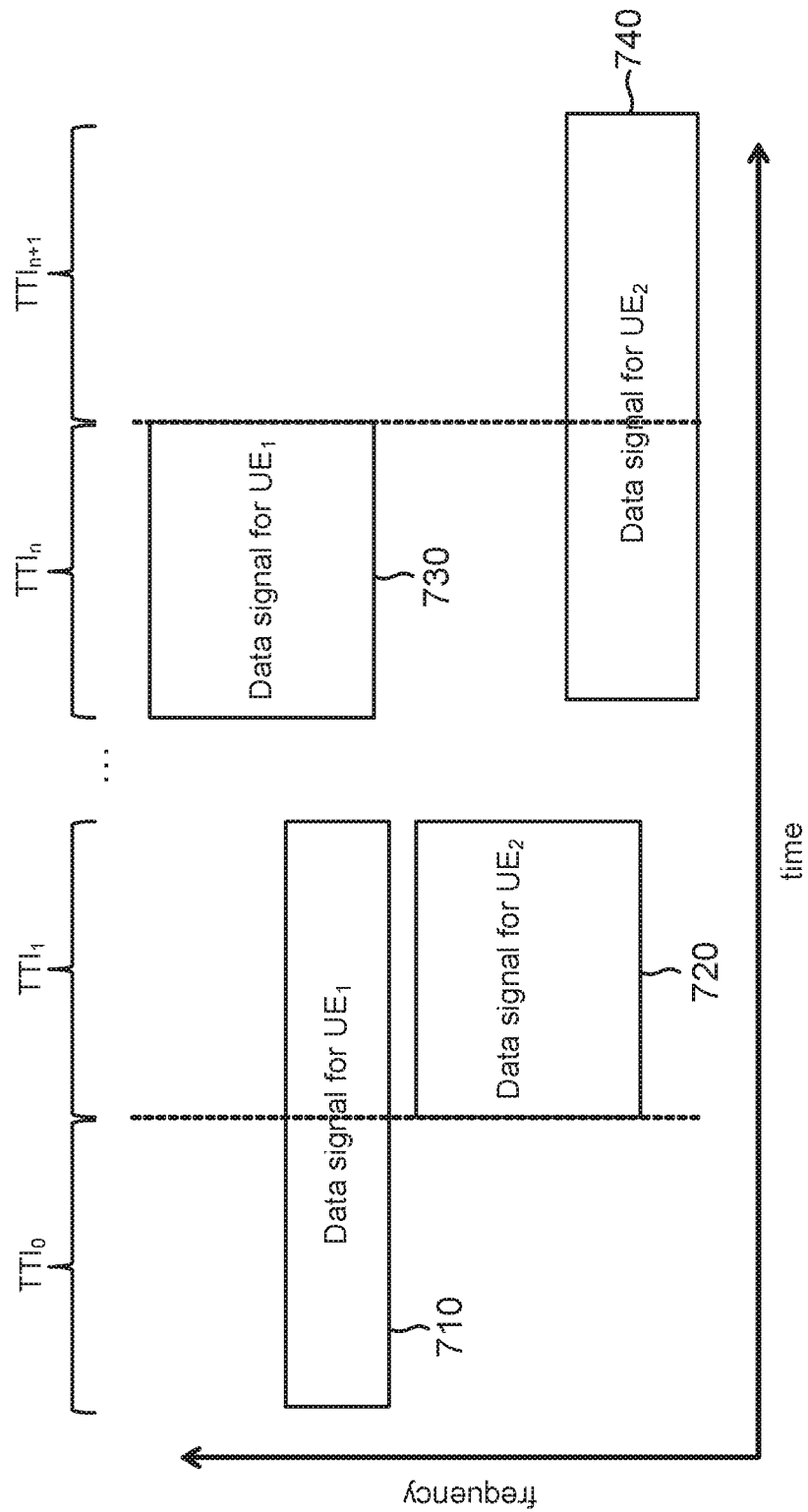
FIG. 7 illustrates an example frame and signal structure for a frequency division multiplexing (FDM) system in accordance with various aspects of the present disclosure.

FIG. 7 illustrates an example frame and signal structure for an FDM system. The carrier frequency for data designated for a given UE is not fixed and can vary. In the FDM scheme, the total system bandwidth can be divided up into a plurality of frequency bands such that data signals for different UEs can be transmitted simultaneously in different frequency bands. For example the data signal for $UE_1$ 710 and the data signal for $UE_2$ 720 overlap in time during $TTI_1$ but do not overlap in frequency. A carrier signal at the center frequency of each of the data signals illustrated in FIG. 7 is used to transmit the various data signals.

The bandwidth allocated for data signals for a given UE can vary over time, as illustrated by comparing data signals 710 and 730 addressed to $UE_1$, for example. A base station may decide to vary the bandwidth for a particular UE due to variations in amount of data available for transmission versus time, for example.

Some conventional FDM schemes transmit OFDM signals using the full available bandwidth for downlink transmissions, with different groups of subcarriers within the full signal allocated to different UEs. As a consequence, each UE typically processes the entire bandwidth to extract the group (s) of subcarriers allocated to the UE. In comparison, when the RF carrier frequency is allowed to vary from transmission to transmission, each UE is notified of what RF carrier is being used for its signals. However, the benefit of the approach with multiple RF carriers is the bandwidth can be used more efficiently if data signals are allowed to use different RF carriers so that each UE does not have to process the entire bandwidth and can use the RF carrier devoted to it.

Figure 8:
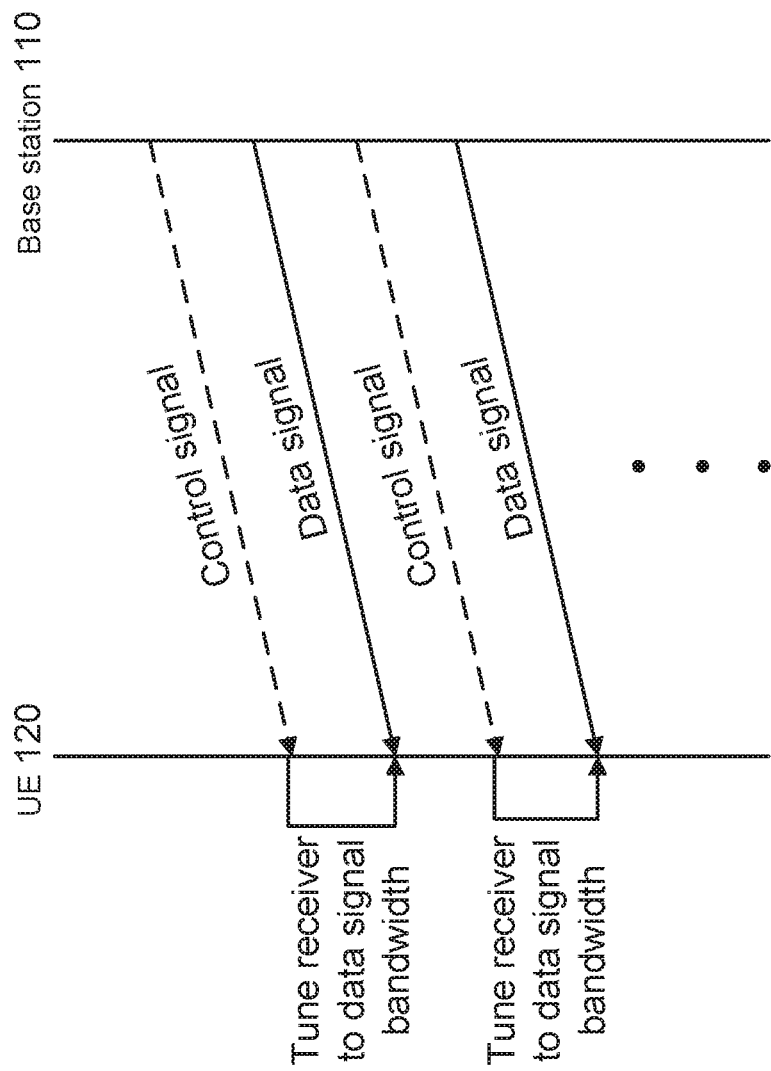
FIG. 8 is a protocol diagram illustrating transmissions between a base station and a UE for an FDM system in accordance with various aspects of the present disclosure.

FIG. 8 is a protocol diagram illustrating the signaling aspects between a UE 120 and a base station 110 to support FDM with variable bandwidths. In this example, control signals are transmitted via a different channel from data signals. The control channel may be in a different frequency band or in a different time slot, as an example. A control signal indicates the center frequency (if center frequency is dynamic) and the bandwidth of an associated data signal. The data signal is then sent using the designated bandwidth and center frequency. In a time interval between the control signal and the data signal, the receiver of the UE 120 is tuned to the data signal bandwidth. This process is repeated as long as there is data to convey between base station 110 and UE 120.

The base station 110 may coordinate this process across different UEs 120 to efficiently utilize the available spectral bandwidth. One example of this coordinated process was described with respect to FIG. 7.

Figure 9:
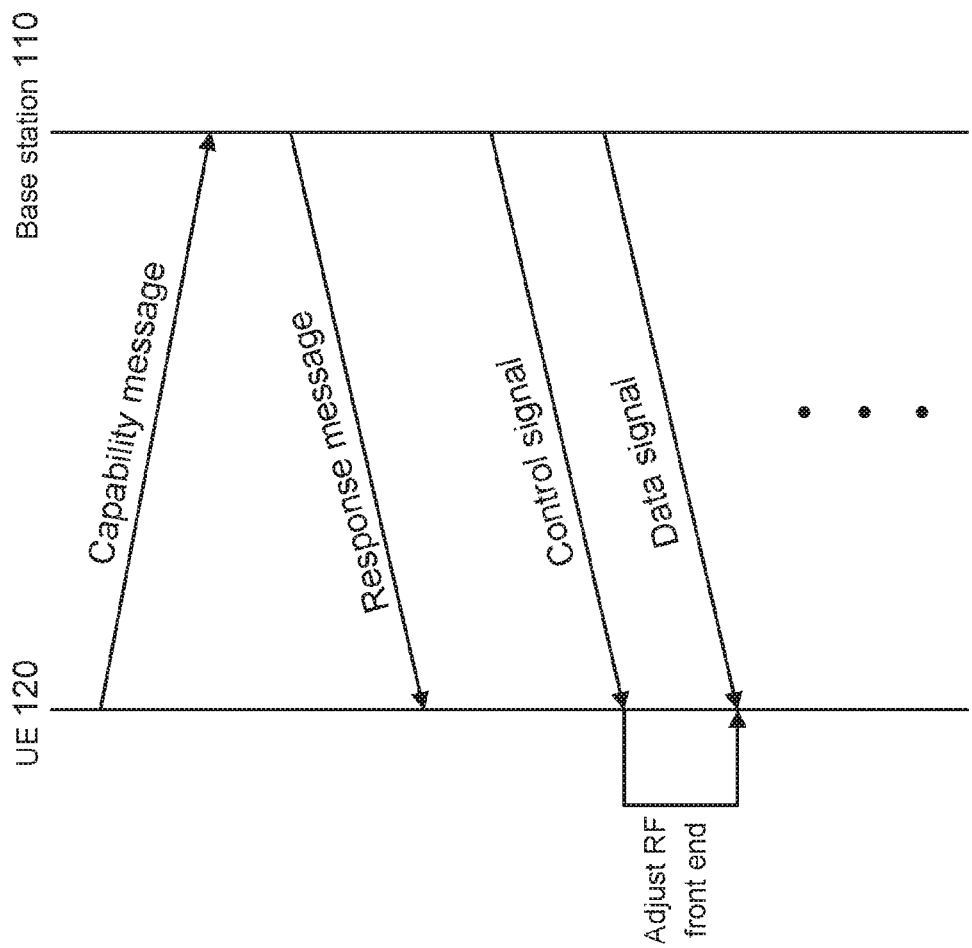
FIG. 9 is a protocol diagram illustrating signaling aspects between a UE and a base station to support dynamic bandwidth switching in accordance with various aspects of the present disclosure.

FIG. 9 is a protocol diagram illustrating the signaling aspects between a UE 120 and a base station 110 to support variable bandwidth signaling. First, the UE 120 transmits a capability message to the base station 110. The capability message may provide one or more indications corresponding to a number of parameters and capabilities of the UE 110. The capability message may include an indication whether the UE 110 is capable of dynamically switching between signals of various bandwidths. The capability message may further include an indication of switching latency for the UE 120, so that the base station 110 can respond by inserting or reserving a time interval between control and data signals to allow the UE 120 to adjust its RF front end. The time interval accommodates the switching latency indicated by a UE.

Next the base station 110 transmits a response message in response to the capability message. The response message may provide one or more indications corresponding to a number of parameters and capabilities. For example, the response message may indicate that dynamic bandwidth switching is activated. Dynamic bandwidth switching may be activated or deactivated as frequently as desired during a connection. Thus, messages indicating that dynamic bandwidth switching is activated or deactivated may be transmitted by the base station 110 as frequently as desired.

The response message may also indicate the time offset between a control signal and the corresponding data signal in a TTI. The time offset may be based on the switching latency indicated in the capability message. The time offset would accommodate the latency needed to decode the control signal and allow the RF front end to switch bandwidths. The response message may also indicate whether the bandwidth is maintained at a wide bandwidth of the data signal for the next control signal, as illustrated in FIG. 5, or returns to a narrow bandwidth, as illustrated in FIG. 3. Alternatively, a previous control signal may also indicate whether the bandwidth is maintained at a wide bandwidth of the data signal for a next control signal, as illustrated in FIG. 5, or returns to a narrow bandwidth, as illustrated in FIG. 3.

Alternatively, the base station 110 may decide not to activate dynamic bandwidth switching. If dynamic bandwidth switching is not activated, the control signals occupy the same bandwidth as data signals and there is no time offset between control signals and data signals.

After the capability message and the response message have been exchanged, transmission of control and data information can proceed as needed. In the example shown in FIG. 9, a control signal is transmitted by the base station 120 and received by the UE 110. Next, the UE 110 adjusts its RF front end, and then a data signal is transmitted by the base station 120 and received by the UE 110.

Figure 10:
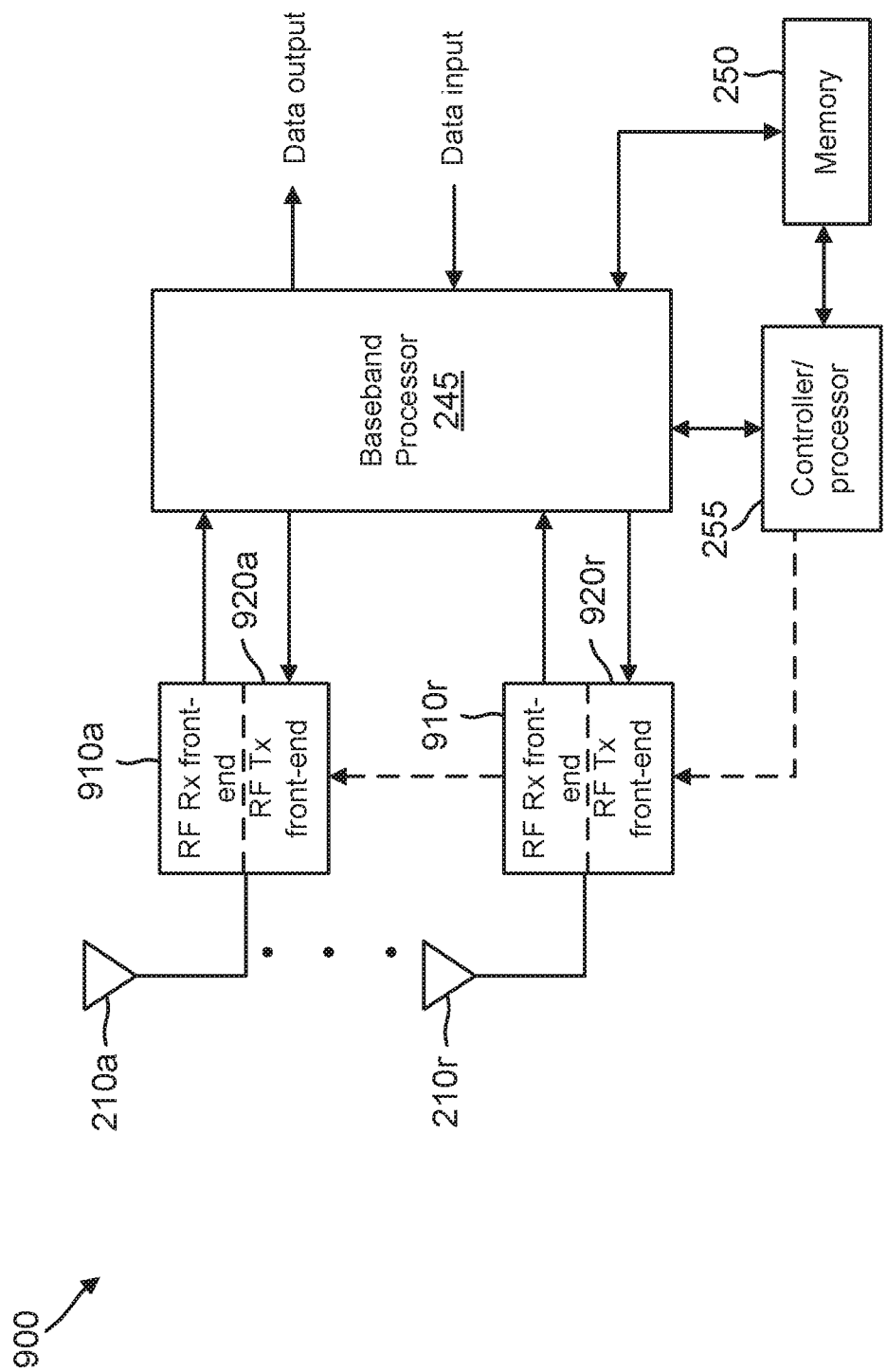
FIG. 10 is a block diagram of a transceiver in accordance with various aspects of the present disclosure.

FIG. 10 is a block diagram of a transceiver 900 that implements aspects of this disclosure. The transceiver 900 comprises antennas 210, baseband processor 245, memory 250, and controller/processor 255 as described previously. The transceiver further includes RF receive (Rx) front ends 910. Each RF Rx front end 910 may include an amplifier, an analog filter, and an ADC as described with respect to FIG. 2. Other RF Rx front end architectures are compatible with this disclosure. For example, some RF Rx front end architectures perform most processing in the analog domain, and some RF Rx front end architectures perform most processing in the digital domain. Furthermore, some RF Rx front end architectures perform most processing at an intermediate frequency (IF), rather than baseband. These RF Rx front ends can be made adjustable to accommodate differences in control signal and data signal bandwidths.

The transceiver further includes RF transmit (Tx) front ends 920. Each RF Tx front end 920 accepts a stream of digital data symbols from baseband processor and converts the digital data symbols to an analog signal for transmission over the corresponding antenna 210.

The transceiver 900 is suitable for either a base station 110 or a UE 120. When the transceiver 900 is in a transmit mode, the RF Tx front ends 920 are engaged, and the controller/processor 255 controls the RF Tx front ends 920 as well as baseband processor 245 to generate signals of various bandwidths. The combination of RF Tx front end 920 and baseband processor 245 is an example of a transmitter. The combination of RF Rx front end 910 and baseband processor 245 is an example of a receiver. An RF Rx front end 910 may comprise the RF front end 212 described previously.

In addition to capabilities described earlier for demodulating OFDM symbols, baseband process 245 may additionally be configured to modulate OFDM symbols. Modulation of OFDM symbols is well known in the art and in some embodiments an inverse FFT (IFFT) is performed to convert frequency domain data to the time domain. As described earlier, there are various techniques for changing bandwidths of OFDM signals. One technique involves varying the number of subcarriers used for generating OFDM signals.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 11:
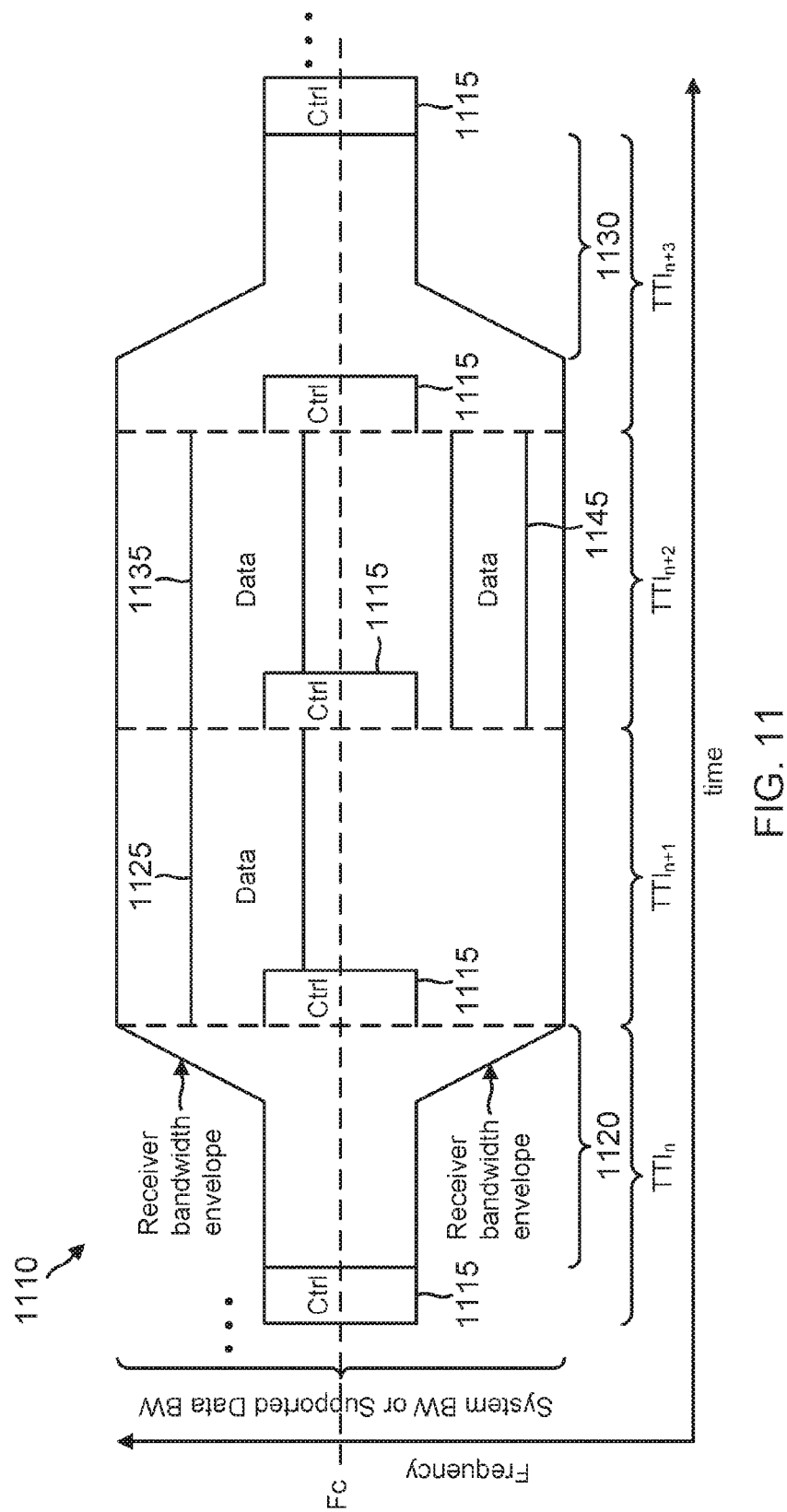
FIGS. 11-16 illustrate additional embodiments of a frame format in accordance with various aspects of the present disclosure.

FIG. 11 illustrates another frame format 1110. The frame format is a TDM format in which time is divided into TTIs and control signals and data signals are time multiplexed. FIG. 11 illustrates a transmitted signal sequence within this frame format 1110.

The control signals 1115 are narrowband control signals. In an embodiment, a base station allows one full TTI duration for bandwidth switching delay of a receiver. There are at least two options for signaling using control signals 1115. In a first option, the control signal 1115 in $TTI_n$ has a bandwidth switch indicator to trigger widening of RF front end bandwidth to receive wider bandwidth data in $TTI_{n+1}$. In this option, the control signal 1115 in $TTI_{n+1}$ indicates what frequency range is allocated for data in $TTI_{n+1}$. In a second option, data radio block allocation 1125 in $TTI_{n+1}$ is allocated or prescheduled using control signal 1115 in $TTI_n$. Once a wide radio front end bandwidth is set up for $TTI_{n+1}$, scheduling can return to normal (i.e., no prescheduling) for subsequent TTIs. For example, control signal 1115 in $TTI_{n+2}$ indicates the use of data resources 1135 and 1145 in $TTI_{n+2}$.

An advantage of the first option is that the scheduler in a base station only needs to know that the UE will be scheduled in the next TTI to set the indicator. The base station scheduler does not need to do the prescheduling and avoids a corresponding increase in complexity. An advantage of the second option is there is a saving of a control channel resource in that there is no bandwidth switch indicator.

The receiver bandwidth envelope is indicated in FIG. 11. The receiver bandwidth envelope represents the frequency range versus time utilized by a receiver, such as adjustable receiver 200, in the frame format of interest. During transition period 1120 the receiver bandwidth may transition from a relatively narrow bandwidth for reception of control signal 1115 to a relatively wide bandwidth (in this embodiment, the full system bandwidth or full bandwidth available for data) for reception of data. Likewise, during transition period 1130 the receiver bandwidth may transition from a relatively wide bandwidth to a relatively narrow bandwidth as shown.

Figure 12:
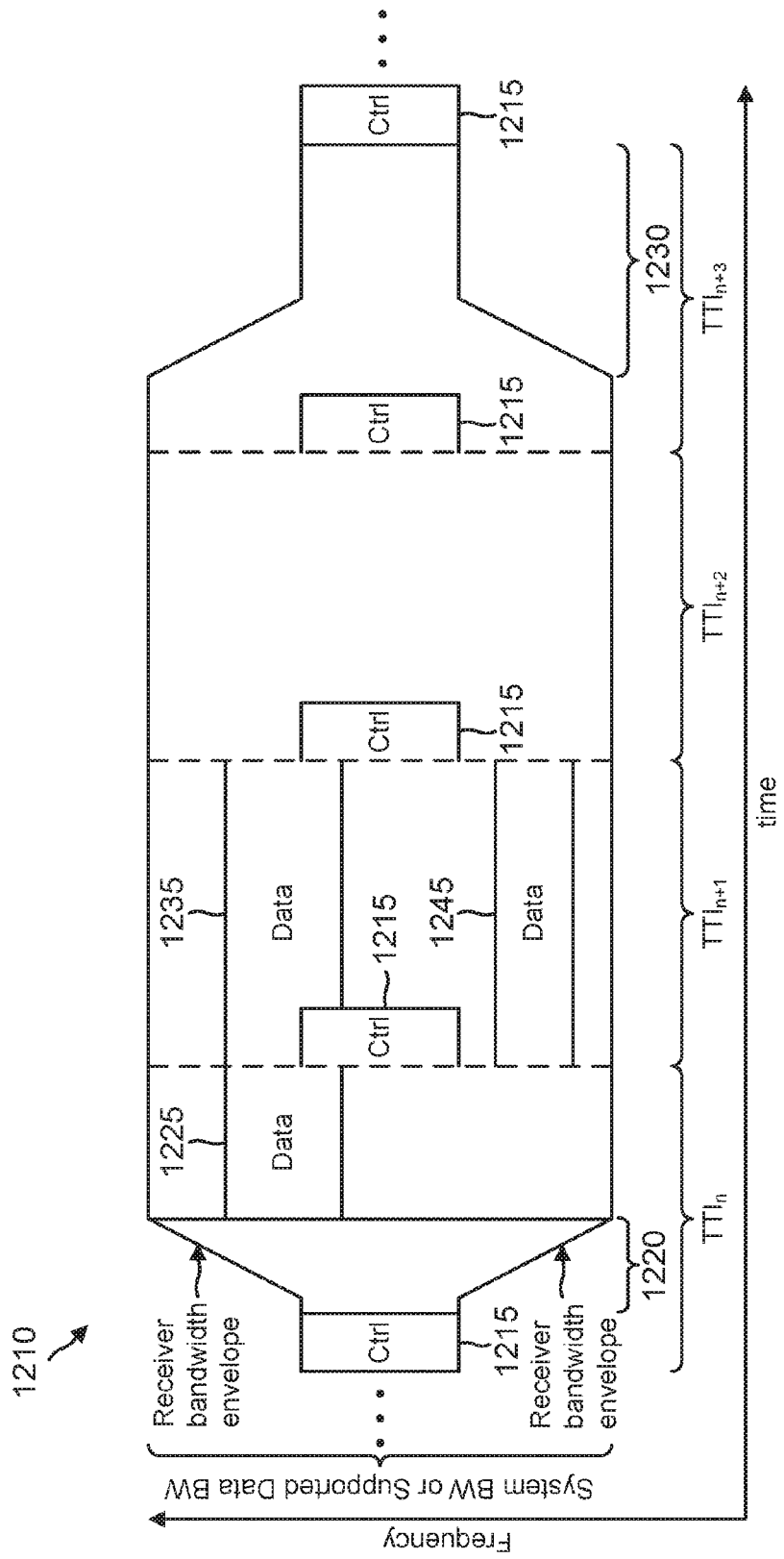

FIG. 12 illustrates another frame format 1210. In this frame format a data signal may be allocated for only a latter fraction or portion of a TTI, such that there is enough time for the receiver bandwidth to transition from a narrow bandwidth to receive a control signal to a wider bandwidth to receive a data signal. For example, in $TTI_n$ the control signal 1215 may indicate that there will be a data signal 1225 later in the TTI. Thus, a smaller duration of a TTI than the example in FIG. 11 may be available for receiver bandwidth switching. During the transition period 1220 the receiver bandwidth is increased. One such example increase of receiver is illustrated by the receiver bandwidth envelope in FIG. 12.

Once the receiver is transitioned to a wider bandwidth in $TTI_n$, data allocation could span the entire TTI, including the option to multiplex with the control channel in frequency. For example, control signal 1215 in $TTI_{n+1}$ may indicate the bandwidths of data signals 1235 and 1245. Control signals that are transmitted after the receiver has transmitted to a higher bandwidth may be referred to as wideband control signals, and in some embodiments a wideband control signal refers to a control signal and one or more data signals that are transmitted simultaneously in different frequency bands (i.e., frequency division multiplexed). An example of a wideband control signal is control signal 1215 in $TTI_{n+1}$ in FIG. 12, and this control signal is frequency division multiplexed with data signals 1235 and 1245. In some embodiments, during a time interval in which a wideband control signal is transmitted, the transmitted signal includes a control signal portion and a data signal portion.

FIG. 12 also illustrates a countdown mechanism for returning a receiver to a narrow band for reception of control signals. In $TTI_{n+2}$, control signal 1215 indicates there is no data within $TTI_{n+2}$. Thus, $TTI_{n+2}$ is a candidate for returning the receiver bandwidth to a narrow bandwidth using mechanisms described previously—for example with respect to FIG. 2. However, rather than having a receiver transition frequently between bandwidths, a countdown mechanism is used. In the first TTI in which there is no data to transmit, a counter is set to a maximum value, such as four, three, two, one or any integer value. In the embodiment in FIG. 12, the maximum value is one. The counter is decremented each successive consecutive TTI that does not contain data. If a TTI does contain data, the counter is reset to the maximum value. In the example of FIG. 12, in $TTI_{n+3}$, if there is no data to transmit, the counter is decremented to zero. A counter value of zero indicates that the receiver should thereafter reduce its bandwidth. For example, in $TTI_{n+3}$, the receiver reduces its bandwidth as shown (the receiver envelope transitions from a wide bandwidth to a narrow bandwidth during transition period 1230). An alternative to the countdown timer is that the receiver bandwidth is reduced to a narrow bandwidth in the first TTI that does not contain data.

Figure 13:
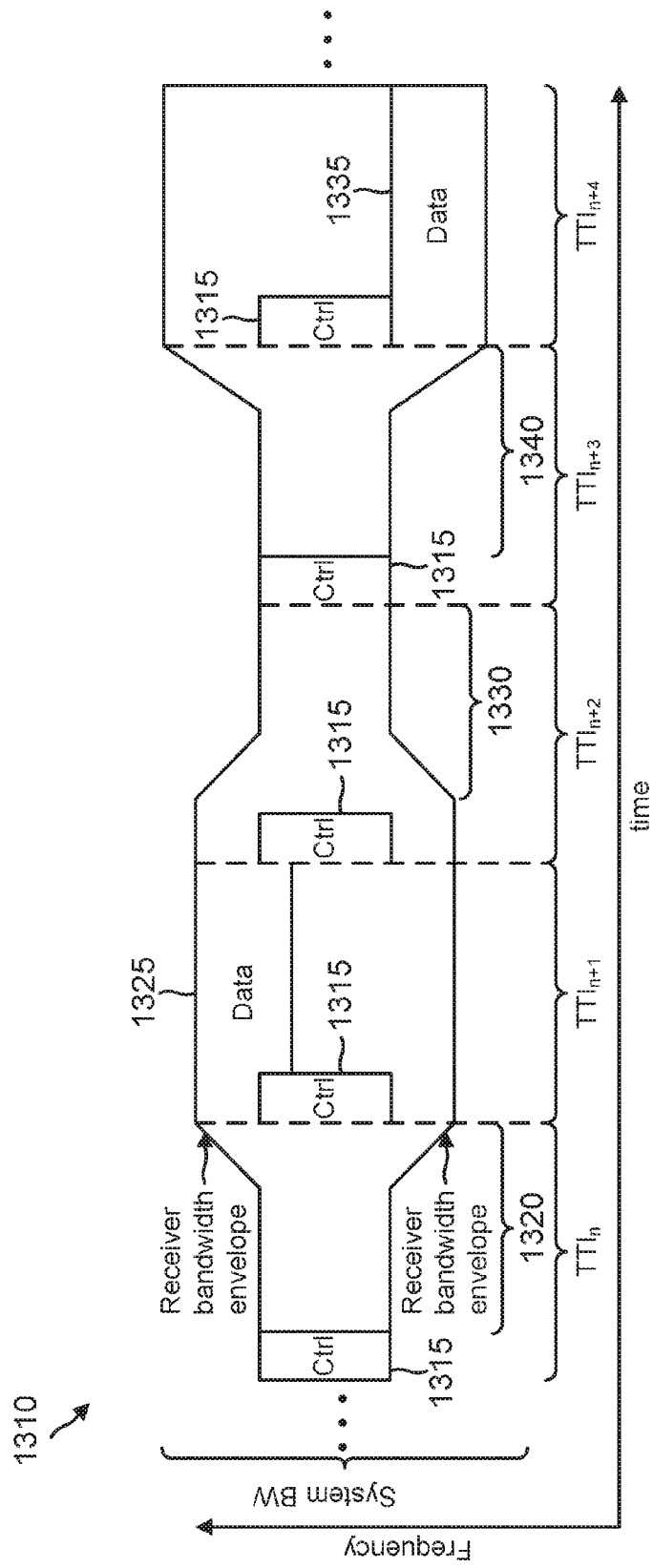

FIG. 13 illustrates another frame format 1310. Frame format 1310 is similar to frame format 1110, except that for frame format 1310, an embodiment of a receiver is enhanced with bandwidth adaptation according to the data allocation. For example, in FIG. 11 during $TTI_{n+1}$ the receiver bandwidth is set to the system bandwidth or the maximum supported data bandwidth, whereas in FIG. 13 the receiver bandwidth during $TTI_{n+1}$ is set just large enough to receive data signal 1325 while remaining symmetric about center frequency $f_c$.

Further, as in FIG. 11 there are at least two options for signaling using control signals 1115. In a first option, the control signal 1115 in $TTI_a$ has a bandwidth switch indicator plus bandwidth information to trigger widening of RF front end bandwidth to be just wide enough to receive wider bandwidth data in $TTI_{n+1}$. In a second option, data radio block allocation 1125 in $TTI_{n+1}$ is allocated or prescheduled using control signal 1115 in $TTI_n$. Once a wide radio front end bandwidth is set up for $TTI_{n+1}$, scheduling can return to normal (i.e., no prescheduling) for subsequent TTIs. For example, control signal 1115 in $TTI_{n+4}$ indicates the use of data resources 1335 in $TTI_{n+4}$. As a further example, control signals 1115 in $TTI_{n+2}$ and $TTI_{n+3}$ indicate that there is no data in the respective TTIs, so the receiver bandwidth remains narrow and the receiver can transition to a state of microsleep.

Figure 14:
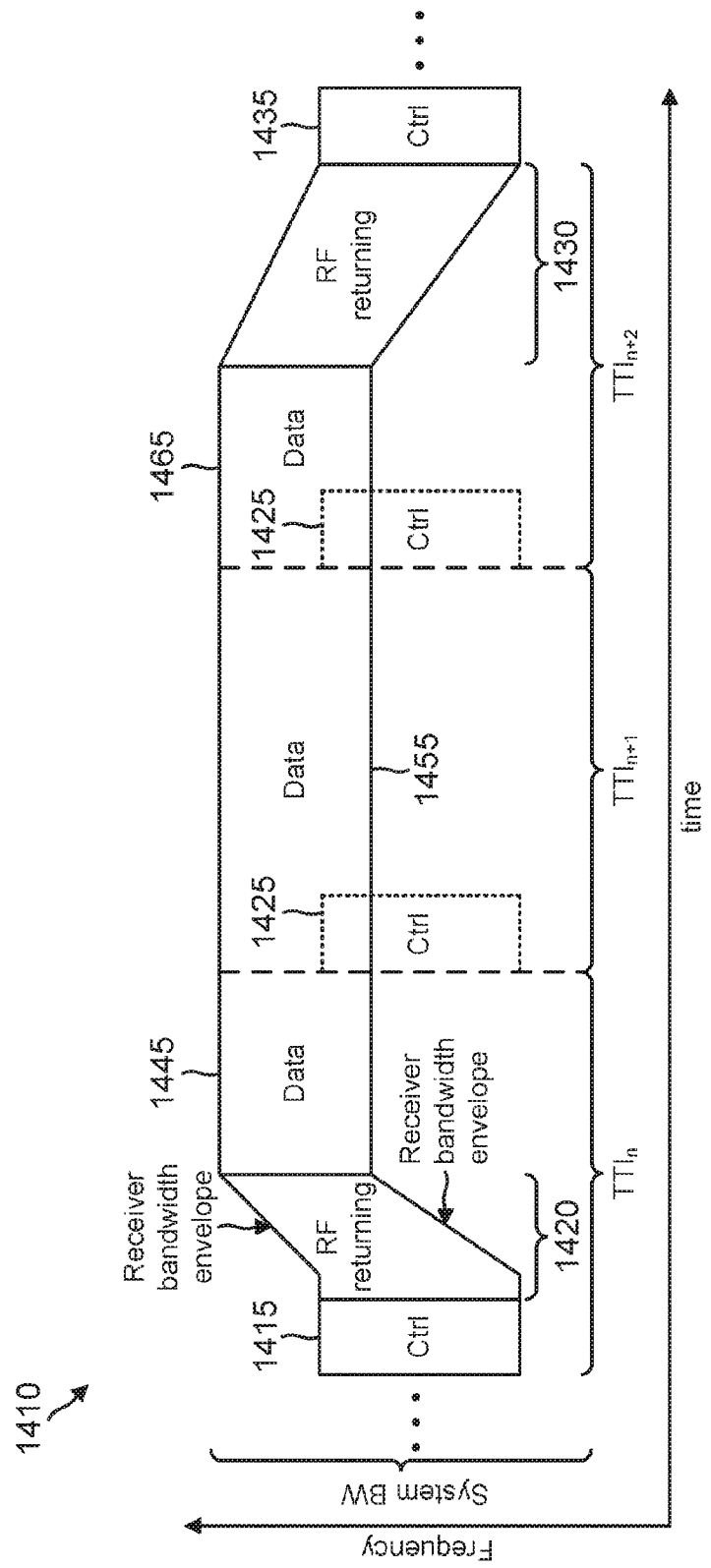

FIG. 14 illustrates another frame format 1410. When this frame format 1410 is used the center frequency may not remain the same independent of TTI. This frame format facilitates use of a receiver that can vary its center frequency and RF front end bandwidth. The receiver bandwidth envelope is indicated.

The bandwidth of a receiver is centered on a frequency at the center of control signal 1415 in $TTI_n$ and then the center is shifted during transition period 1420 to the frequency at the center of data signal 1445.

This frame format 1410 combined with prescheduling of data signals 1445, 1455, and 1465 using control signal 1415 implies that the control signals 1425 may be ignored by a receiver configured to receive data signals 1445, 1455 and 1465. As illustrated in FIG. 14 prescheduling fractional TTIs for data signals may be performed. For example, data signals 1445 and 1465 occupy a fraction of a TTI time interval, and the duration of the data signals may be indicated by control signal 1415. After data signal 1465, the RF front end may be re-tuned to a bandwidth for control signal 1435 during transition period 1430.

Figure 15:
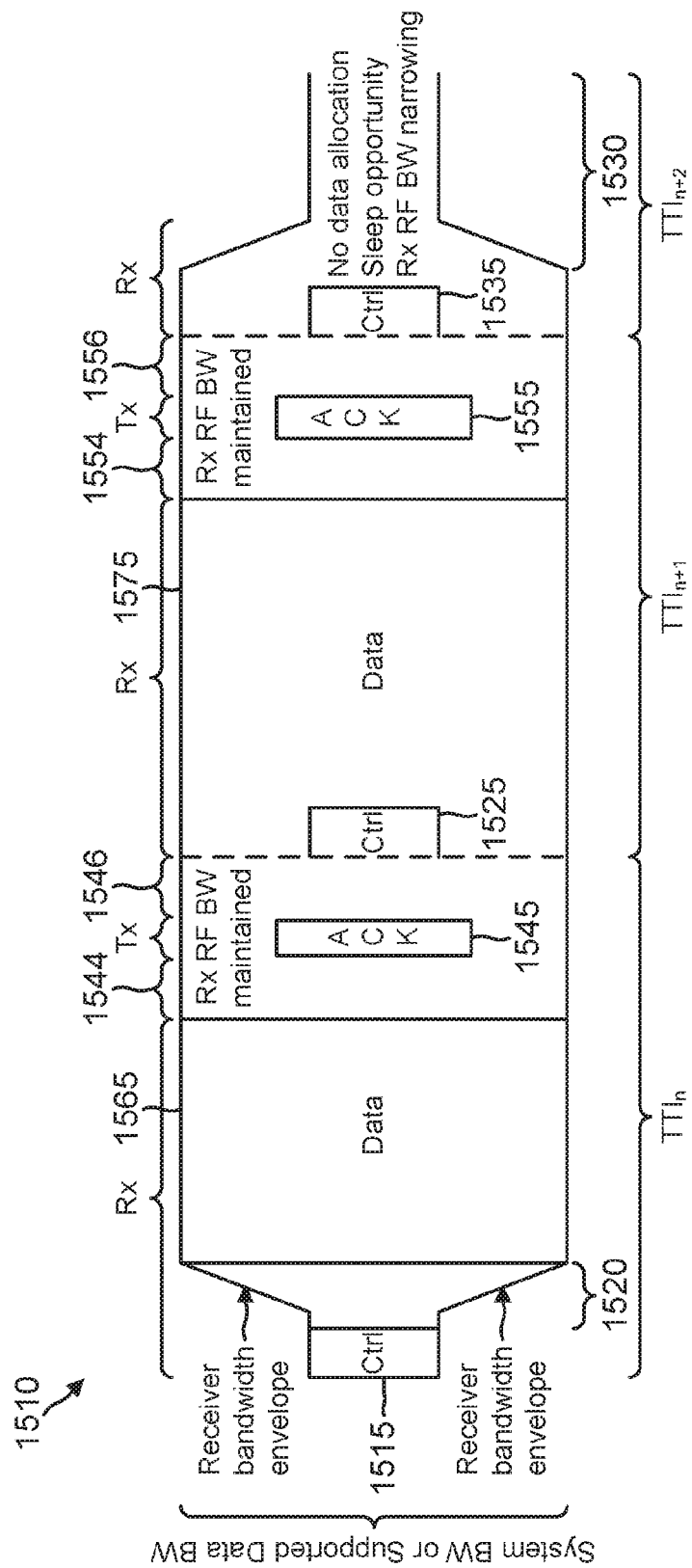

FIG. 15 illustrates another frame format 1510. The frame format 1510 is an example TDM format in which control signals and data signals are received by a UE, and acknowledgement messages (ACKs) are transmitted by the UE in response to reception of data signals. In an embodiment, an ACK is used to indicate whether all or part of a preceding data signal was received correctly. In this frame format 1510 the RF front end bandwidth of a receiver is maintained at the system bandwidth or maximum available data bandwidth until a TTI is received that does not have a data allocation. For example, in $TTI_{n+2}$, control signal 1535 indicates that there is no data in the TTI so a receiver can reduce its bandwidth during transition period 1530 as shown. Guard periods may be inserted on either side of an ACK. For example, guard periods 1544 and 1546 are inserted on either side of ACK 1445.

An example embodiment of scheduling data signals according to frame format 1510 is as follows. Control signal 1515 in $TTI_n$ may be used to schedule data signal 1565 for a fraction of the TTI. After receiving control signal 1515 a receiver transitions its RF front end bandwidth to receive data signal 1565 as shown. Alternatively (not illustrated), control signal 1515 in $TTI_n$ could carry bandwidth switch indicator or prescheduling information, similar to the scheme described in FIG. 11, and data allocation is deferred until $TTI_{n+1}$. This scheme avoids allocation of data RBs for only a fraction of TTI (as in 1565), at the expense of delayed start for the data transfer. Thereafter, the RF frond end bandwidth is maintained at a wide bandwidth until a control signal in a TTI indicates that there is no data in the TTI. Narrowband control signal 1525 indicates that data signal 1575 is present, so the receiver is configured to receive the data signal. The control signal 1525 may use a subset of the available subcarriers, and the portion of the data signal 1575 that is simultaneous with the control signal 1525 may occupy the remaining available subcarriers. Control signal 1535 indicates that there is no data in $TTI_{n+2}$, so the receiver reduces its RF front end bandwidth and may also transition to a microsleep state during the transition period 1530.

Some advantages of the frame format 1510 include the following. First, for consecutive TTI data allocation, once the overhead is paid for RF bandwidth widening (causing delayed start of data radio blocks), in the subsequent TTI there is no data radio block overhead. Second, enhancements for wideband-to-narrowband transitions, such as a countdown timer or bandwidth switch indicator described with respect to FIG. 12, could also be applied.

Figure 16:
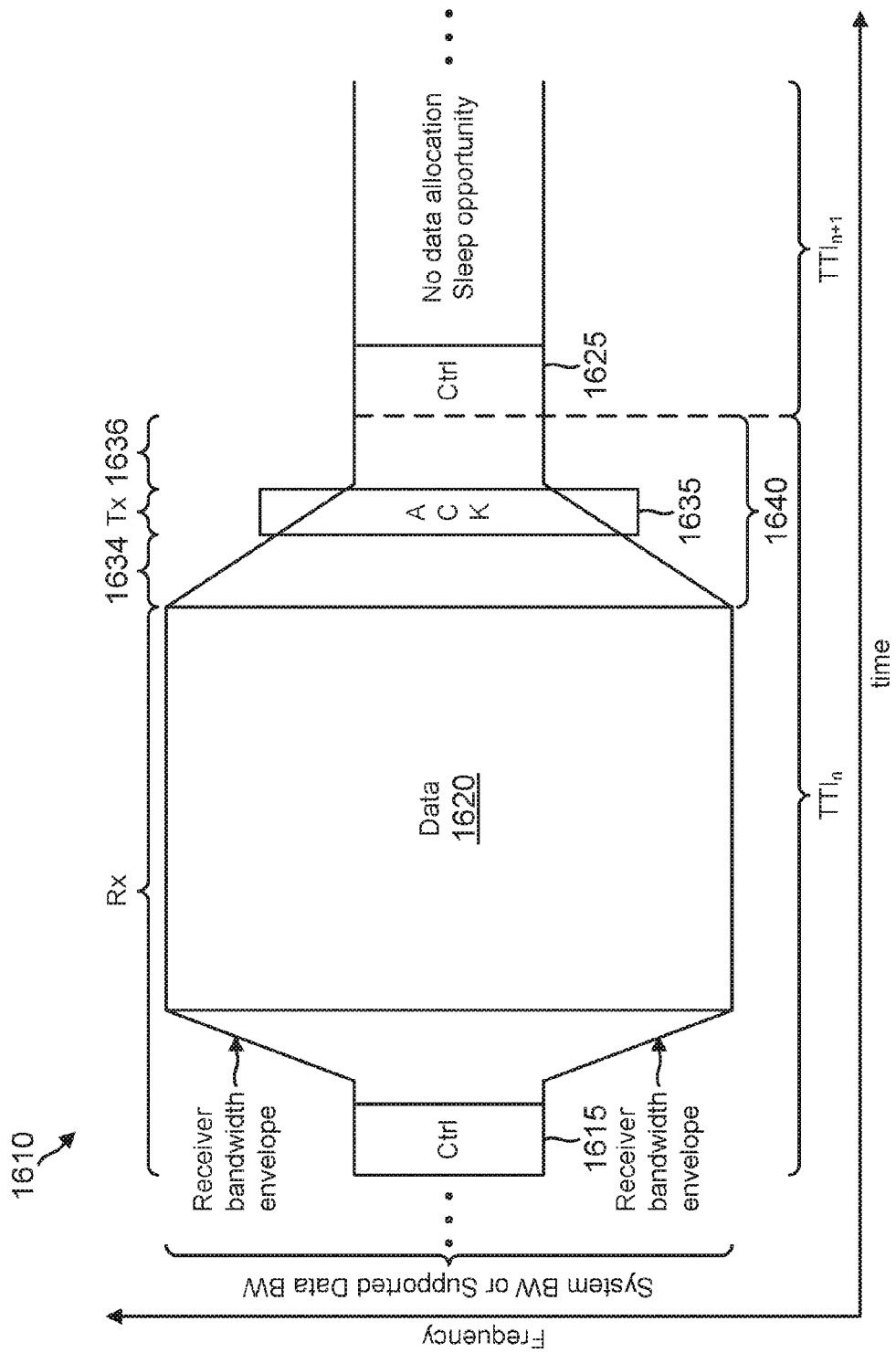

FIG. 16 illustrates another frame format 1610. The frame format 1610 is an example TDM format in which control signals and data signals are received by a UE, and ACKs are transmitted by the UE in response to reception of data signals. An example embodiment of scheduling data signals according to frame format 1610 is as follows. Control signal 1615 in $TTI_n$ may be used to schedule data signal 1620 for a fraction of the TTI. After receiving control signal 1615 a receiver transitions its RF front end bandwidth to receive data signal 1620 as shown. The receiver switches back to a narrowband bandwidth for reception of each control signal as shown. For example, the receiver transitions to a narrow bandwidth during transition period 1640 and then receives control signal 1625 using a narrow bandwidth as shown. An advantage of the frame format 1610 may include that bandwidth switching behavior is the same across TTIs.

Once it is appreciated how the frame formats in FIGS. 3 and 5 can be implemented using the adjustable receiver 200 as described previously, it is readily understood that the frame formats in FIGS. 11-16 can be implemented in a straightforward manner using the adjustable receiver 200.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication in a mobile device, comprising:
   receiving a control signal having a first bandwidth; and
   receiving a data signal having a second bandwidth wider than the first bandwidth,
   wherein the control signal and the data signal are received over a single carrier frequency, wherein the control signal comprises an indication of a characteristic of the data signal, wherein the data signal is transmitted after the control signal such that the data signal and control signal are separated by a time interval, and wherein the time interval is based on a switching latency of the mobile device.

2. The method of claim 1, wherein the indication indicates that the second bandwidth completely occupies an available bandwidth.

3. The method of claim 1, wherein the indication indicates that the second bandwidth occupies only a portion of an available bandwidth.

4. The method of claim 1, further comprising switching from the first bandwidth to the second bandwidth after receiving the control signal and switching from the second bandwidth to the first bandwidth after receiving the data signal.

5. The method of claim 1, further comprising receiving a second data signal using a third bandwidth over the single carrier frequency, wherein the third bandwidth is wider than the first bandwidth and different than the second bandwidth.

6. The method of claim 1, further comprising adjusting a radio frequency (RF) front end of the mobile device to receive using the second bandwidth.

7. The method of claim 1, further comprising, in response to receiving the control signal, adjusting a radio frequency (RF) front end of the mobile device to receive using the second bandwidth.

8. The method of claim 1, wherein the characteristic is the second bandwidth, and wherein the method further comprises, in response to the indication of the second bandwidth, adjusting a radio frequency (RF) front end of the mobile device to receive using the second bandwidth.

9. The method of claim 1, further comprising:
   transmitting a capability message, wherein the capability message comprises a dynamic bandwidth switching capability indication of the mobile device; and
   receiving a response message comprising an indication that dynamic bandwidth switching is activated.

10. The method of claim 9, wherein the capability message further comprises an indication of switching latency of the mobile device, wherein the response message further comprises an indication of the time interval between the control signal and the data signal, wherein the time interval is based on the indication of switching latency, and wherein the method further comprises:
    adjusting a radio frequency (RF) front end of the mobile device, during the time interval, to receive using the second bandwidth.

11. The method of claim 10, wherein the response message or the control signal further comprises a control signal switching indication, wherein the method further comprises:
    in response to the control signal switching indication, maintaining the RF front end to receive using the second bandwidth immediately after receiving the data signal; and
    receiving a second control signal using the second bandwidth immediately after the data signal.

12. The method of claim 11, wherein the second control signal indicates that there is no subsequent data signal prior to a third control signal, and wherein the method further comprises receiving the third control signal using the first bandwidth.

13. The method of claim 11, wherein the second control signal indicates that there is a subsequent data signal, and wherein the method further comprises receiving the subsequent data signal using the second bandwidth.

14. The method of claim 1, further comprising receiving a second data signal using a third bandwidth over a second single carrier frequency, wherein the third bandwidth is wider than the first bandwidth and different than the second bandwidth, and wherein the single carrier frequency and the second single carrier frequency are different.

15. The method of claim 1, wherein the control signal and the data signal are in a same transmission time interval (TTI).

16. The method of claim 1, wherein the control signal and the data signal are in a different transmission time interval (TTI).

17. The method of claim 1, further comprising receiving a second control signal using the second bandwidth, wherein the second control signal indicates that there is no subsequent data signal in a transmission time interval (TTI), and wherein the indication resets a counter to a maximum value, wherein the counter is decremented for each subsequent consecutive TTI that does not include data, wherein bandwidth is maintained at the second bandwidth until the counter reaches zero, and wherein the receiver is transitioned to the first bandwidth when the counter reaches zero.

18. The method of claim 17, wherein the second bandwidth occupies only a portion of an available bandwidth.

19. The method of claim 17, wherein in response to the second control signal indicating that there is no subsequent data signal, turning off a portion of a radio frequency front end of the mobile device during a portion of the time interval between the second control signal and a third control signal.

20. A computer program product for wireless communications, comprising:
a non-transitory computer-readable medium having program code recorded thereon, the program code including:
code for causing a receiver to receive a control signal having a first bandwidth; and
code for causing the receiver to receive a data signal having a second bandwidth wider than the first bandwidth,
wherein the control signal and the data signal are received over a single carrier frequency, wherein the control signal comprises an indication of a characteristic of the data signal, wherein the data signal is transmitted after the control signal such that the data signal and control signal are separated by a time interval, and wherein the time interval is based on a switching latency of the receiver.

21. The computer program product of claim 20, wherein the indication indicates that the second bandwidth completely occupies an available bandwidth.

22. The computer program product of claim 20, wherein the indication indicates that the second bandwidth occupies only a portion of an available bandwidth.

23. The computer program product of claim 20, further comprising:
code for causing the receiver to switch from the first bandwidth to the second bandwidth after receiving the control signal; and
code for causing the receiver to switch from the second bandwidth to the first bandwidth after receiving the data signal.

24. The computer program product of claim 20, further comprising code for causing the receiver to receive a second data signal using a third bandwidth over the single carrier frequency, wherein the third bandwidth is wider than the first bandwidth and different than the second bandwidth.

25. The computer program product of claim 20, wherein the receiver comprises a radio frequency (RF) front end, and wherein the computer program product further comprises code for adjusting the RF front end to receive using the second bandwidth.

26. The computer program product of claim 20, wherein the receiver comprises a radio frequency (RF) front end, and wherein the computer program product further comprises code for, in response to receiving the control signal, adjusting the RF front end to receive using the second bandwidth.

27. The computer program product of claim 20, wherein the receiver comprises a radio frequency (RF) front end, wherein the characteristic is the second bandwidth, and wherein the computer program product further comprises code for, in response to the indication of the second bandwidth, adjusting the RF front end to receive using the second bandwidth.

28. The computer program product of claim 20, further comprising:
code for causing a transmitter to transmit a capability message, wherein the capability message comprises a dynamic bandwidth switching capability indication of a mobile device; and
code for causing the receiver to receive a response message comprising an indication that dynamic bandwidth switching is activated.

29. The computer program product of claim 28, wherein the capability message further comprises an indication of switching latency of the mobile device, wherein the response message further comprises an indication of the time interval between the control signal and the data signal, wherein the time interval is based on the indication of switching latency, wherein the receiver comprises a radio frequency (RF) front end, and wherein the computer program product further comprises:
code for causing the RF front end, during the time interval, to adjust to receive using the second bandwidth.

30. The computer program product of claim 29, wherein the response message or the control signal further comprises a control signal switching indication, wherein the computer program product further comprises:
code for, in response to the control signal switching indication, maintaining the RF front end to receive using the second bandwidth immediately after receiving the data signal; and
code for causing the receiver to receive a second control signal using the second bandwidth immediately after the data signal.

31. The computer program product of claim 30, wherein the second control signal indicates that there is no subsequent data signal prior to a third control signal, and wherein the computer program product further comprises code for causing the receiver to receive the third control signal using the first bandwidth.

32. The computer program product of claim 30, wherein the second control signal indicates that there is a subsequent data signal, and wherein the computer program product further comprises code for causing the receiver to receive the subsequent data signal using the second bandwidth.

33. A mobile device comprising:
an adjustable radio-frequency (RF) front end configured to:
receive a control signal having a first bandwidth; and
receive a data signal having a second bandwidth wider than the first bandwidth,
wherein the control signal and the data signal are received over a single carrier frequency, wherein the control signal comprises an indication of a characteristic of the data signal, wherein the data signal is transmitted after the control signal such that the data signal and control signal are separated by a time interval, and wherein the time interval is based on a switching latency of at least the adjustable RF front end.

34. The mobile device of claim 33, wherein the adjustable RF front end comprises:
an amplifier,
an analog-to-digital converter (ADC); and
an analog filter coupled between the amplifier and the ADC, wherein the amplifier, the analog filter, and the ADC are configured to:
receive first command signals from a control processor to adjust to receive the control signal having the first bandwidth; and
receive second command signals from the control processor to adjust to receive the data signal having the second bandwidth.

35. The mobile device of claim 34, wherein the amplifier, the analog filter, and the ADC are further configured to adjust to receive the data signal during the time interval.

36. The mobile device of claim 34, wherein the indication indicates that the second bandwidth completely occupies an available bandwidth.

37. The mobile device of claim 34, wherein the indication indicates that the second bandwidth occupies only a portion of an available bandwidth.

38. The mobile device of claim 34, wherein the control signal and the data signal are in a same transmission time interval (TTI).

39. The mobile device of claim 34, wherein the control signal and the data signal are in a different transmission time interval (TTI).

40. The mobile device of claim 39, wherein the amplifier, the analog filter, and the ADC are further configured to receive third command signals from a control processor to adjust to receive a second control signal, wherein the second control signal indicates that there is no subsequent data signal in a transmission time interval (TI), wherein in response to the indication a counter is reset to a maximum value, wherein the counter is decremented for each subsequent consecutive TTI that does not include data, wherein bandwidth is maintained at the second bandwidth until the counter reaches zero, and wherein the RF front end is transitioned to the first bandwidth when the counter reaches zero.

41. The mobile device of claim 39, wherein the second bandwidth occupies only a portion of an available bandwidth.

42. The mobile device of claim 39, wherein the amplifier, the analog filter, and the ADC are further configured to receive third command signals from the control processor to adjust to receive a second control signal, wherein the second control signal indicates that there is no subsequent data signal in a transmission time interval (TTI), wherein in response to the second control signal indicating that there is no subsequent data signal, at least one of the amplifier, the analog filter, and the ADC is configured to be turned off during a portion of the TTI.

43. A wireless communications apparatus comprising:
an amplifier,
an analog-to-digital converter (ADC);
an analog filter coupled between the amplifier and the ADC; and
a control processor coupled to the amplifier, the ADC, and the analog filter, wherein the control processor is configured to:
transmit a capability message indicating at least a switching latency of the wireless communication apparatus;
in response to receiving control information from control signal having a first bandwidth:
set a bandwidth of the amplifier and the ADC to a second bandwidth wider than the first bandwidth; and
set a sampling rate of the ADC according to the second bandwidth,
wherein the switching latency is associated with the setting the bandwidth of the amplifier and the ADC to the second bandwidth and the setting the sampling rate of the ADC according to the second bandwidth.

44. The wireless communications apparatus of claim 43, wherein the control information provides an indication of a characteristic of a data signal.

45. The wireless communications apparatus of claim 44, wherein the indication indicates that the second bandwidth completely occupies an available bandwidth.

46. The wireless communications apparatus of claim 44, wherein the indication indicates that the second bandwidth occupies only a portion of an available bandwidth.

47. A wireless communication apparatus comprising:
a control processor configured to:
couple to a radio frequency (RF) front end:
transmit, via the RF front end, a capability message indicating at least a switching latency of the RF frontend;
adjust the RF front end to receive a control signal having a first bandwidth; and
adjust the RF front end to receive a data signal having a second bandwidth wider than the first bandwidth, wherein the control signal and the data signal are received over a single carrier frequency, and wherein the switching latency is associated with the adjusting the RF front end to receive the data signal having the second bandwidth.

48. The wireless communication apparatus of claim 47, wherein the control processor is further configured to:
couple to a baseband processor, and
receive control information from the baseband processor obtained from the control signal,
wherein adjusting the RF front end to receive the data signal is in response to the control information.

49. The wireless communication apparatus of claim 48, wherein the control information provides an indication of the second bandwidth.

* * * * *